US011669939B1

(12) United States Patent
Ferrés et al.

(10) Patent No.: US 11,669,939 B1
(45) Date of Patent: Jun. 6, 2023

(54) BURST DEBLURRING WITH KERNEL ESTIMATION NETWORKS

(71) Applicant: GoPro, Inc., San Mateo, CA (US)

(72) Inventors: Matias Tassano Ferrés, Paris (FR); Thomas Nicolas Emmanuel Veit, Meudon (FR); Julie Delon, Paris (FR); Pablo Muse Freire, Montevideo (UY)

(73) Assignee: GoPro, Inc., San Mateo, CA (US)

( * ) Notice: Subject to any disclaimer, the term of this patent is extended or adjusted under 35 U.S.C. 154(b) by 302 days.

(21) Appl. No.: 17/000,832

(22) Filed: Aug. 24, 2020

Related U.S. Application Data

(60) Provisional application No. 62/911,657, filed on Oct. 7, 2019.

(51) Int. Cl.
*G06T 5/00* (2006.01)
*G06T 5/50* (2006.01)
*G06T 3/40* (2006.01)
*G06N 3/04* (2023.01)
*G06N 3/08* (2023.01)
(Continued)

(52) U.S. Cl.
CPC ............. *G06T 5/003* (2013.01); *G06N 3/045* (2023.01); *G06N 3/08* (2013.01); *G06N 20/10* (2019.01); *G06T 3/4084* (2013.01); *G06T 5/50* (2013.01); *G06T 7/11* (2017.01); *G06T 2207/10024* (2013.01); *G06T 2207/20056* (2013.01);
(Continued)

(58) Field of Classification Search
None
See application file for complete search history.

(56) References Cited

U.S. PATENT DOCUMENTS 6,643,406 B1 * 11/2003 Hajjahmad ............... G06T 5/10
382/240
9,189,834 B2 * 11/2015 Lin ....................... G06V 10/443
(Continued)

OTHER PUBLICATIONS

R. Jiang, L. Zhao, T. Wang, J. Wang and X. Zhang, "Video Deblurring via Temporally and Spatially Variant Recurrent Neural Network," in IEEE Access, vol. 8, pp. 7587-7597, Dec. 2019, doi: 10.1109/ACCESS.2019.2962505. (Year: 2019).*
(Continued)

*Primary Examiner* — Emily C Terrell
*Assistant Examiner* — Nathan J Bloom
(74) *Attorney, Agent, or Firm* — Young Basile Hanlon & MacFarlane, P.C.

(57) ABSTRACT

A method for deblurring a target image includes receiving a burst of images that includes the target image; partitioning respective images of the burst of images into respective patches; converting, to a frequency domain, the respective patches into respective transform patches; selecting a first set of corresponding transform patches from the respective transform patches, where the first set of the corresponding transform patches includes a respective transform patch for a respective image of the burst of images; obtaining, using a neural network, respective weight maps for the corresponding transform patches; obtaining a deblurred transform patch by combining the first set of corresponding transform patches using the respective weight maps; obtaining a first deblurred patch by converting the deblurred transform patch to a pixel domain; and obtaining a deblurred image of the target image using the first deblurred patch.

20 Claims, 15 Drawing Sheets

(51) Int. Cl.
*G06N 20/10* (2019.01)
*G06T 7/11* (2017.01)
*G06N 3/045* (2023.01)

(52) U.S. Cl.
CPC ............... *G06T 2207/20084* (2013.01); *G06T 2207/20112* (2013.01); *G06T 2207/20201* (2013.01)

(56) References Cited

U.S. PATENT DOCUMENTS

| | | | | |
|---|---|---|---|---|
| 10,997,695 | B2* | 5/2021 | Senzaki | G06T 5/002 |
| 2019/0206070 | A1* | 7/2019 | Nash | G06T 7/33 |
| 2019/0385280 | A1* | 12/2019 | Huang | G06T 5/20 |
| 2021/0217202 | A1* | 7/2021 | Zakharchenko | H04N 19/597 |

OTHER PUBLICATIONS

Delbracio M, Sapiro G. Burst deblurring: Removing camera shake through fourier burst accumulation. InProceedings of the IEEE Conference on Computer Vision and Pattern Recognition 2015 (pp. 2385-2393). (Year: 2015).*

Wieschollek P, Schölkopf B, Lensch H, Hirsch M. End-to-end learning for image burst deblurring. Inasian conference on computer vision Nov. 20, 2016 (pp. 35-51). Springer, Cham. (Year: 2016).*

Chakrabarti A. A neural approach to blind motion deblurring. InEuropean conference on computer vision Oct. 8, 2016 (pp. 221-235). Springer, Cham. (Year: 2016).*

Aittala et al., "Bust Image Deblurring Using Permutation Invariant Convolutional Neural Networks", CVF, https://link.springer.com/conference/eccv, 17 pages.

Anger et al., "Implementation of Local Fourier Burst Accumulation for Video Deblurring", Image Processing On Line, 7, ISSN 2105-1232, 2017, https://doi.org/10.5201/ipol.2017.197, pp. 56-64 pages.

Ayan Chakrabarti, "A Neural Approach to Blind Motion Deblurring", arXiv:1603.04771v2 (cs.CV) Aug. 1, 2016, 15 pages.

Bako et al., "Kernel-Predicting Convolutional Networks for denoising Monte Carlo Renderings", ACM Transactions on Graphics, vol. 36, No. 4, Article 97, Publication date: Jul. 2017, 14 pages.

Cho et al., "Fast Motion Deblurring", ACM, 28, 5, Dec. 2009, http://doi.acm.org/10.1145/1618452.1618491, 8 pages.

D.P. Kingma and J.L. Ba, "ADAM: A Method for Stochastic Optimization," Proc. ICLR, pp. 1-15, 2015.

Delbracio et al., "Burst Deblurring: Removing Camera Shake Through Fourier Burst Accumulation", CVF, pp. 2385-2393.

Delbracio et al., "Hand-held Video Deblurring via Efficient Fourier Aggregation", arXiv:1509.05251 v3 (cs.CV) Dec. 4, 2015, 14 pages.

Fergus et al., "Removing Camera Shake from a Single Photograph", 2006 Association for Computing Machinery, Inc. 8 pages.

Gavant et al., "A Physiological Camera Shake Model for Image Stabilization Systems", 2011 IEEE, Downloaded Aug. 28, 2020, 4 pages.

Gharbi et al., "Deep Bilateral Learning for Real-Time Image Enhancement", ACM Transaction on Graphics, vol. 36, No. 4, arXiv:1707.02880v2 (cs.GR) Aug. 22, 2017, 12 pages.

Guo et al., "Toward Convolutional Blind Denoising of Real Photographs", CVF, pp. 1712-1722.

Joshi et al., "Seeing Mr. Rainier: Lucky Imaging for Multi-Image Denoising, Shapening, and Haze Removal", 8 pages.

Kalantari et al., "Deep HDR Video from Sequences with Alternating Exposures", Eurographics 2019, vol. 38 (2019) No. 2, 13 pages.

Krizhevsky et al., "ImageNet Classification with Deep Convolutional Neural Networks", 9 pages.

Ma et al., "Waterloo Exploration Database: New Challenges for Image Quality Assessment Models", IEEE Transaction on Image Processing, vol. 26, No. 2, Feb. 2017, pp. 1004-1016.

Michaeli et al., "Blind Deblurring Using Internal Patch Recurrence", D. Fleet et al. (Eds.): ECCV 2014, Part III, LNCS 8691, pp. 783-798, 2014.

Mildenhall et al., "Burst Denoising with Kernel Prediction Networks", CVF, pp. 2502-2510.

Ronneberger et al., "U-Net: Convolutional Networks for Biomedical Image Segmentation", http://lmb.informatik.uni-freiburg.de/, arXiv:1505.04597v1 (cs.CV) May 18, 2015, 8 pages.

Schwartz et al., "DeepISP: Towards Learning an End-to-End Image Processing Pipeline", arXiv:1801.06724v2 (eess.IV) Feb. 3, 2019, 12 pages.

Sergey Ioffe and Christian Szegedy, "Batch Normalization: Accelerating Deep Network Training by Reducing Internal Covariate Shift," in Proc. ICML. 2015, pp. 448-456, JMLR.org.

Sroubek et al., "Robust Multichannel Blind Deconvolution via Fast Alternating Minimization", IEEE Transactions on Image Processing, vol. 21, No. 4, Apr. 2012, pp. 1687-1700.

Sun et al., "Learning a Convolutional Neural Network for Non-uniform Motion Blur Removal", CVF, pp. 769-777.

Thijs Vogels, "Kernel-Predicting Convolutional Neural Networks for Denoising Monte Carlo Renderings", ETH Zurich & Disney Research Zurich Mar. 2016-Sep. 2016, 77 pages.

Thijs Vogels, Fabrice Rousselle, Brian McWilliams, Gerhard Rothlin, Alex Harvill, David Adler, Mark Meyer, and Jan Novak, "Denoising with kernel prediction and asymmetric loss functions," ACM Trans. Graphics, vol. 37, No. 4, pp. 124, 2018.

Wang et al., "Recent Progress in Image Deblurring", arXiv:1409.6838v1 (cs.CV) Sep. 24, 2014, 53 pages.

Wieschollek et al., "Learning Blind Motion Deblurring", CVF, pp. 231-240.

Xu et al., "Motion Blur Kernel Estimation via Deep Learning", IEEE Transactions on Image Processing, vol. 27, No. 1, Jan. 2018, pp. 194-205.

Zhang et al., "Multi-Image Blind Deblurring Using a Coupled Adaptive Sparse Prior", CVF, pp. 1051-1058.

* cited by examiner

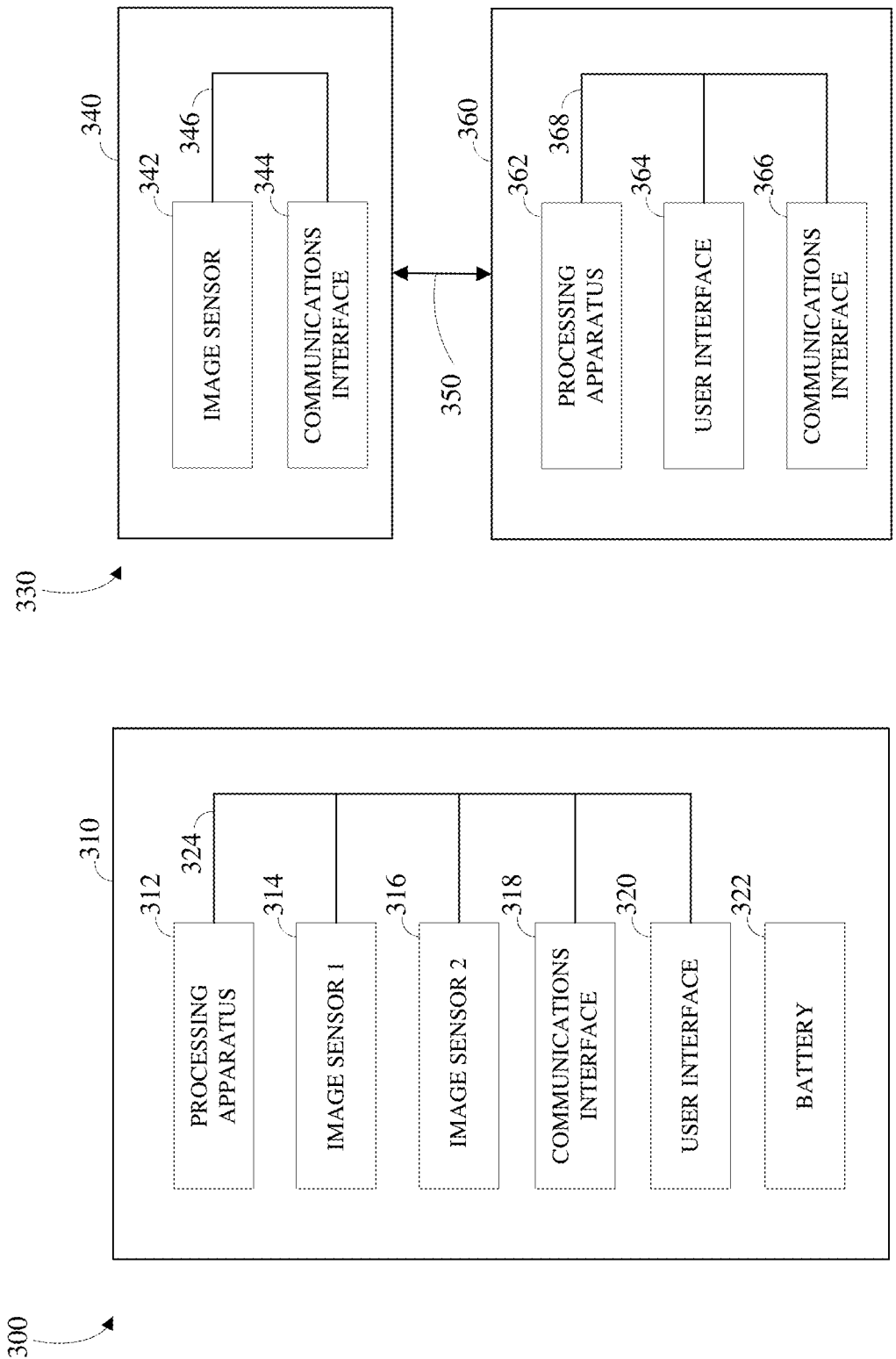

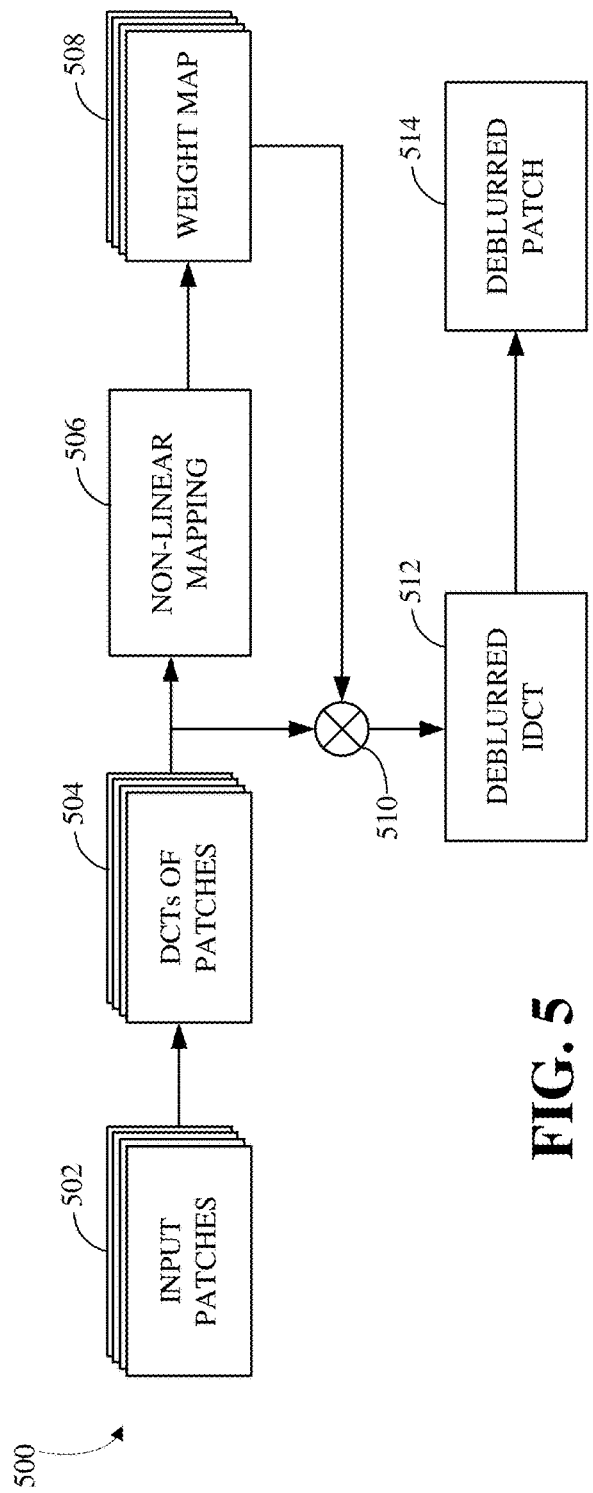
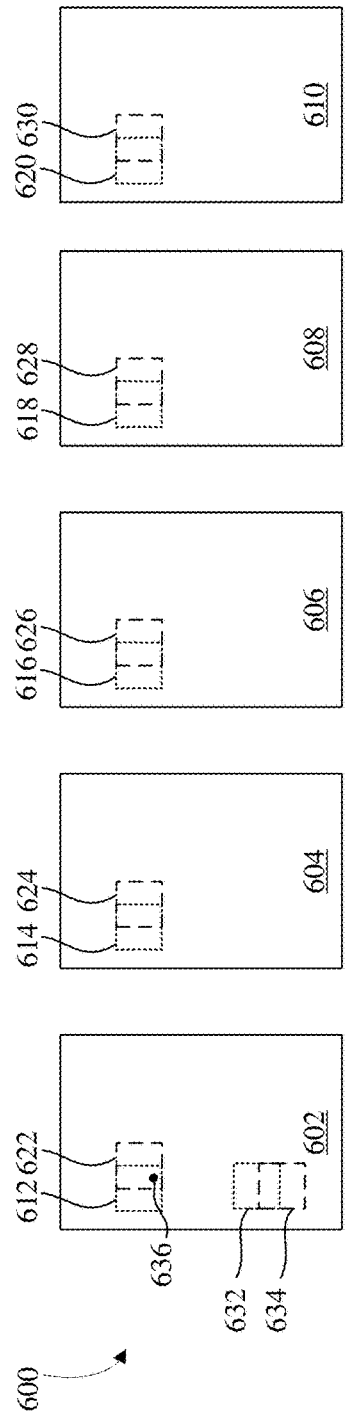
FIG. 5
FIG. 6

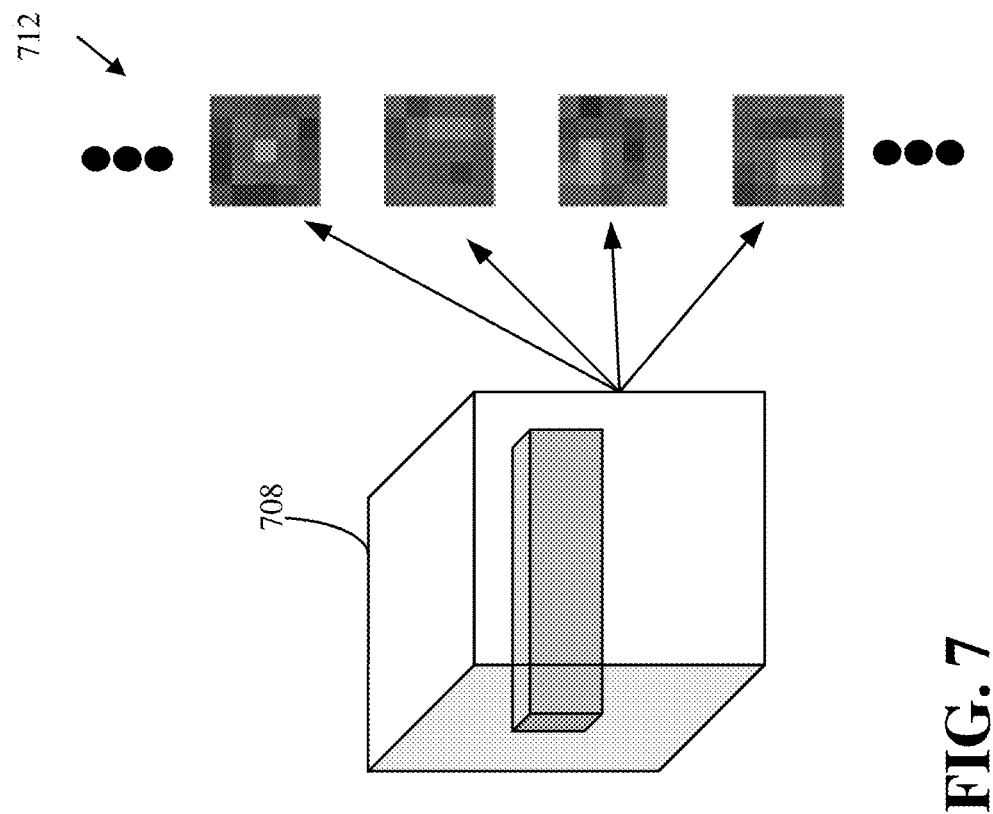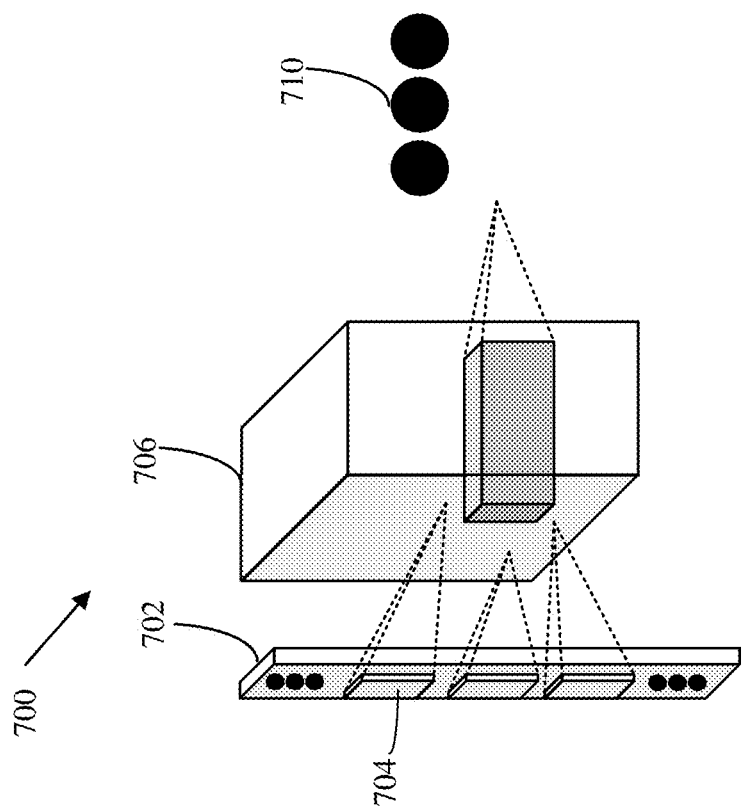
FIG. 7

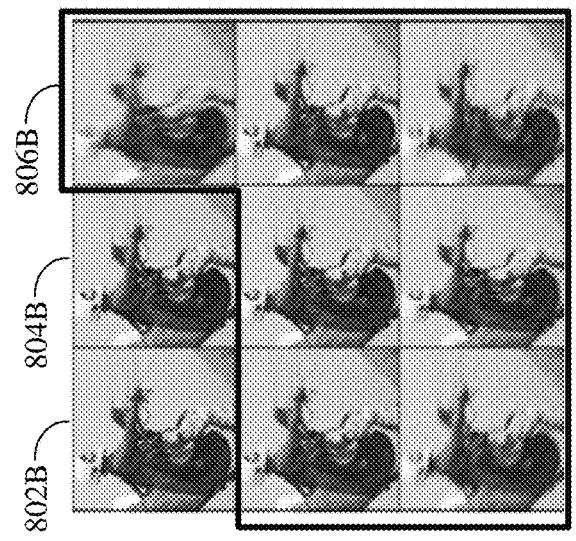
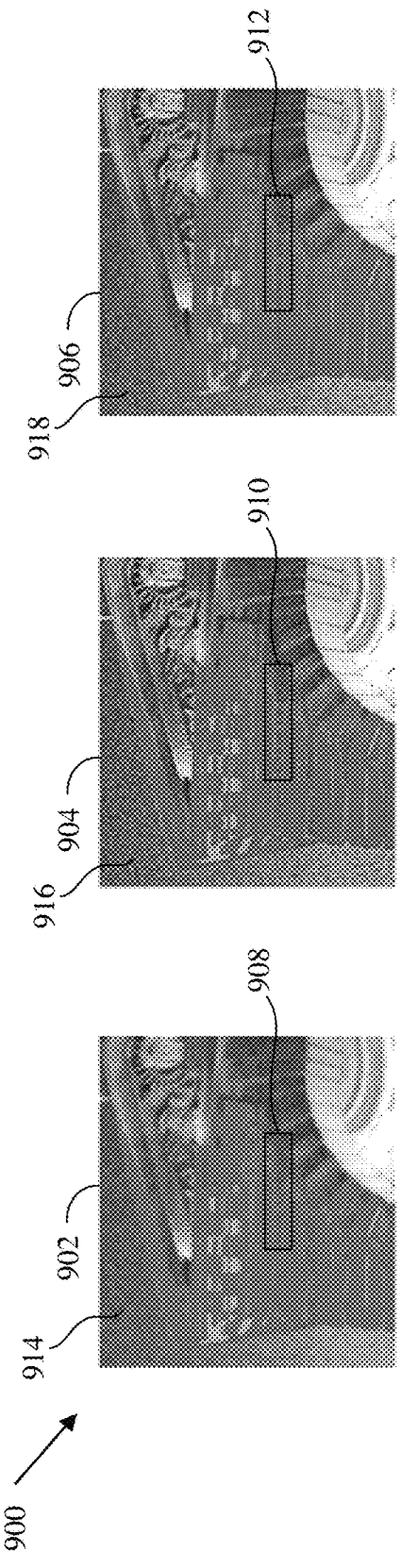
FIG. 8
FIG. 9

US 11,669,939 B1

BURST DEBLURRING WITH KERNEL ESTIMATION NETWORKS

CROSS-REFERENCE TO RELATED APPLICATION(S)

This application claims priority to and the benefit of U.S. Provisional Application Patent Ser. No. 62/911,657, filed Oct. 7, 2019, the entire disclosure of which is hereby incorporated by reference.

TECHNICAL FIELD

This disclosure relates in general to image processing and more specifically to motion deblurring.

BACKGROUND

An image represents a scene over an, albeit short, period of time. That period of time corresponds to an exposure time, which is the length of time that sensors of the camera are exposed to light.

Motion blur, such as blurred and/or streaking objects in images (e.g., still images or frames of a video) captured by cameras, such as digital cameras, can be due to several reasons. During the exposure time, objects in the scene can move thereby resulting in motion blur. Camera shake due to, for example, hand tremors of the photographer can be one of the dominant sources of motion blur. Under dim lighting conditions, the exposure time can be longer. Thus, images or videos captured (such as by hand-held devices) under dim lighting conditions (i.e., under conditions requiring longer exposure time), combined with camera shake, can be particularly susceptible to motion blur. In addition to blur, an image captured under low lighting conditions can include noise.

Motion blur and/or image noise can be undesirable artefacts in images. Despite advances in digital imaging devices and/or image processing, motion blur remains one of the most challenging problems in photography. Deblurring and/or denoising, to sharpen images that include motion blur and/or noise, can be desirable.

SUMMARY

Disclosed herein are implementations of burst deblurring with kernel estimation networks.

A first aspect is a method for deblurring a target image. The method includes receiving a burst of images that includes the target image; partitioning respective images of the burst of images into respective patches; converting, to a frequency domain, the respective patches into respective transform patches; selecting a first set of corresponding transform patches from the respective transform patches, where the first set of the corresponding transform patches includes a respective transform patch for a respective image of the burst of images; obtaining, using a neural network, respective weight maps for the corresponding transform patches; obtaining a deblurred transform patch by combining the first set of corresponding transform patches using the respective weight maps; obtaining a first deblurred patch by converting the deblurred transform patch to a pixel domain; and obtaining a deblurred image of the target image using the first deblurred patch.

A second aspect is an image capture device for deblurring a target image of a burst of images. The image capture device includes a processor that is configured to obtain weight maps for combining co-extensive transform-domain patches of the burst of images, the co-extensive transform-domain patches include patches from respective images of the burst of images, and the weight maps correspond to respective transform domain patches of the co-extensive transform-domain patches; combine, using the weight maps, the co-extensive transform-domain patches to obtain a deblurred transform patch; and inverse-transform the deblurred transform patch to obtain a deblurred patch of the target image.

A third aspect is a non-transitory computer-readable storage medium that includes executable instructions that, when executed by a processor, facilitate performance of operations to deblur or denoise a target image. The operations include operations to partition color channels of images of a burst of images, which includes the target image, into respective color-channel patches; transform at least some of the respective color-channel patches into respective transform color-channel patches that are composed of respective transform coefficients; concatenate the respective transform coefficients of at least some of the respective transform color-channel patches to obtain an input vector of transform coefficients; input the input vector of transform coefficients into a neural network to obtain weight maps; combine corresponding coefficients of the respective transform color-channel patches using the weight maps to obtain respective deblurred color-channel transform patches; inverse-transform the respective deblurred color-channel transform patches to obtain deblurred color-channel pixel patches; and combine the deblurred color-channel pixel patches to obtain a deblurred image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

FIG. 5 is a block diagram of steps of deblurring an image in accordance with an implementation of this disclosure.

FIG. 6 is a diagram of an example of a burst of images in accordance with implementations of this disclosure.

FIG. 7 is an example of a kernel-prediction convolutional network (KPCN) in accordance with implementations of this disclosure.

FIG. 8 is a diagram of examples of training pairs of KPCN in accordance with implementations of this disclosure.

FIG. 9 is a comparative example showing results of training with and without noise in accordance with implementations of this disclosure.

DETAILED DESCRIPTION

Figure 1A:
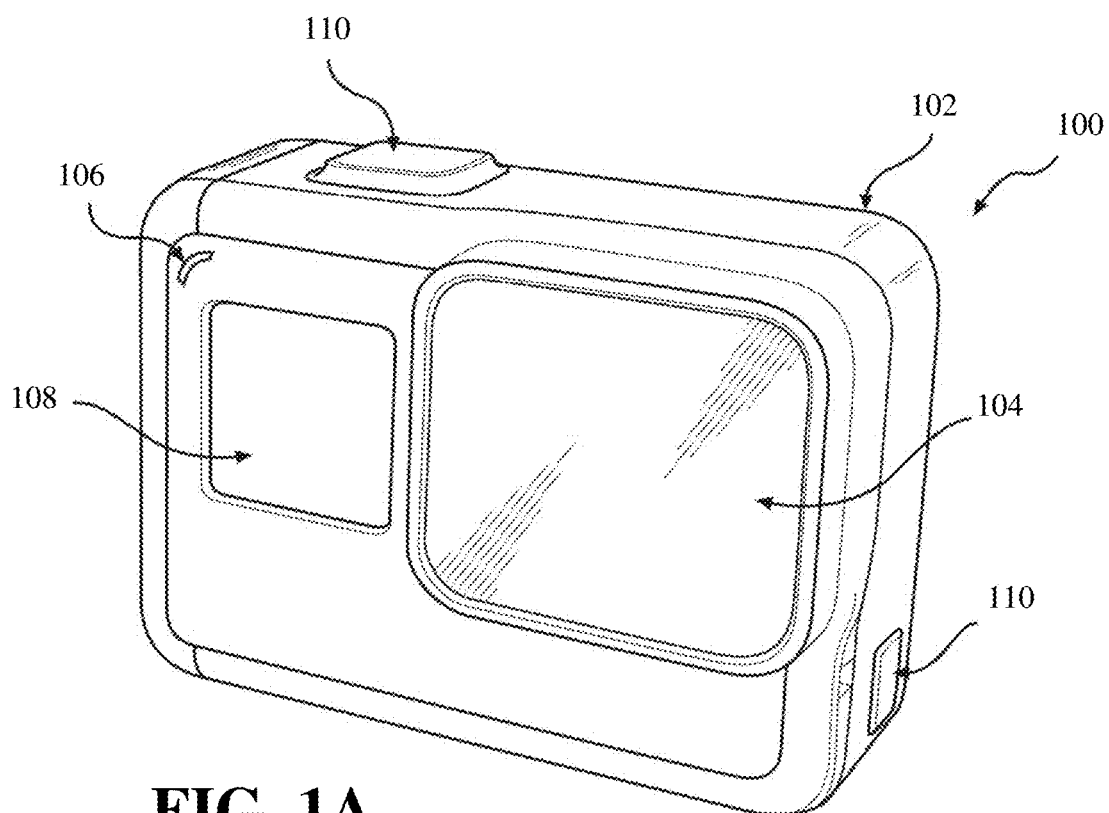
FIGS. 1A-D are isometric views of an example of an image capture device.

As mentioned above, motion blur is an undesirable artefact that can be due to several factors. A technique for deblurring images can include capturing more information about a scene and deblurring the image using the more information.

Capturing more information can mean, or can include, capturing a burst of images. That is, instead of simply capturing one image, several images (also referred to as a burst or a burst of images) can be captured. In an example, the burst of images can include 7 images of the scene. Each of the images of the burst of images can be expected to also include image blur. The information from the multiple images of the burst of images can be used to construct a (e.g., one) deblurred image that is the final image of the scene. It is noted that images captured under low lighting conditions may include noise in addition to the blur. It is also noted that multiple frames of a video can also be used (or referred to) as the burst of images.

To reiterate, a burst of burry and potentially noisy images can be captured to reconstruct a deblurred image. Several techniques have been proposed for reconstructing a deblurred image from a burst of images. However, some such techniques may not be suitable for real-time or near real-time processing. Whereas a user expects to immediately see (such as on a display of a handheld device, which can be or can include a camera) an image that the user captured, such techniques may take a few minutes, or even up to a half an hour, to produce a deblurred image from a burst of images. As such, such techniques are not suitable for use on a hand-held camera.

A set of such of techniques can be referred as deconvolution methods. The deconvolution methods seek to jointly estimate (i.e., from the burst of images) a blurring kernel and the latent sharp image via deconvolution. Some deconvolution techniques can employ neural networks to estimate blur kernels and then apply a classical non-blind deconvolution algorithm to a blurred image to obtain a latent deblurred image. However, such deconvolution techniques can have several shortcomings. For example, these deconvolution techniques heavily depend on the accuracy of an assumed degradation model and hence may underperform when the model does not correctly describe the real data. For example, deconvolution techniques tend to be computationally very expensive. Hence, deconvolution techniques may be impractical for use in real-time application, such as on a hand-held device where near-instantaneous results (i.e., views of captured images) are expected.

Another set of such techniques can be referred to as multi-image aggregation techniques. Such techniques rely on the observation that contiguous frames in a burst or video are usually blurred differently. Then, best pixels from aligned neighboring frames can be chosen to deblur a target frame. Such techniques align the images of the burst of images. Each of the aligned images can then be converted to the frequency domain. For example, a Fourier or a Fast Fourier Transform can be used. The corresponding (e.g., co-located) coefficients of the transformed images can then be combined. For example, for each location of the transforms of coefficients, a respective best coefficient can be selected from amongst the coefficients for each frame. The "best coefficient" refers to the coefficient that is least blurred from amongst the corresponding coefficients.

In an example, Delbracio and Sapiro (Mauricio Delbracio and Guilermo Sapiro. (2015). Burst deblurring: Removing Camera Shake Through Fourier Burst Accumulation. Proceedings of the IEEE Computer Society Conference on Computer Vision and Pattern Recognition.) introduced an algorithm, which is incorporated herein by reference, that aggregates a burst of blurry images in the Fourier domain by combining well-preserved parts of the power spectra. In another example, Wieschollek et al. (Patrick Wieschollek, Michael Hirsch, Bernhard Scholkopf, and Hendrik P.A. Lensch. (2017). Learning Blind Motion Deblurring. IEEE International Conference on Computer Vision) proposed a recurrent neural architecture to deblur bursts of arbitrary length. The frames are fed into the network one at a time, yielding a new estimate of the sharp image each time a new frame is input. In another example, Aittala and Durand (Miika Aittala and Frédo Durand. (2018). Burst image deblurring using permutation invariant convolutional neural networks. European Conference on Computer Vision, pp. 748-764) presented a neural architecture which enforces permutation invariance by construction. That is, the ordering of the input frames (i.e., the burst of images) does not affect the output. This architecture is composed of modified U-Net blocks that share the information existent in their feature maps at all scales. Much in the spirit of Delbracio and Sapiro, the network is able to select the best-preserved responses of the input frames to construct a deblurred estimate.

Fourier Burst Accumulation (FBA) is an example of the multi-image aggregation technique. FBA computes a deblurred estimate of a blurred image as a weighted combination of all aligned input frames (i.e., of an image burst or a video sequence) in the Fourier domain. FBA favors stable Fourier coefficients in the burst of images containing sharp information. Said another way, images of a burst are converted to the transform domain (using a Fourier transform or a Fast Fourier Transform) and, for each location of the transform of the coefficients, the corresponding transform coefficients are combined. The weights used in the combination result in the selection of the best coefficient among all the coefficients of each frame. The best coefficient in this context means the coefficient that has been least blurred.

An extension of the FBA algorithm is referred to as Local FBA (See "Delbracio, Mauricio & Sapiro, Guillermo. (December 2015). Hand-held Video Deblurring via Efficient Fourier Aggregation. IEEE Transactions on Computational Imaging, pp. 270-283."). Local FBA computes the FBA algorithm on overlapping patches (or tiles). The benefits of processing the burst by patches include limiting the effect of spatially-variant blur kernels and reducing potential frequency artifacts such as ringing.

To process a blurry burst of 2M+1 frames (i.e., images), the 2M+1 are registered (registering frames is explained below), the frames are split into sets of partially overlapped patches $\{P^j\}_{j=1 \ldots Npatches}$, where Npatches is the number of patches. The FBA method is then applied to each set of corresponding patches and the results are aggregated to construct the final deblurred image. A deblurred patch estimate $\bar{P}^l$ is computed as a weighted average of the Fourier transform $\mathcal{F}(P^l_i)=\hat{P}^l_i$ of the patches from the 2M+1 frames, as given by formula (1):

$$\bar{P}^l = \mathcal{F}^{-1}\left(\sum_{i=-M}^{M} \omega_i \cdot \mathcal{F}(P^l_i)\right), \omega_i = \frac{\zeta_\sigma(|\hat{P}^l_i|)^p}{\sum_{j=-M}^{M} \zeta_\sigma(|\hat{P}^l_j|)^p} \quad (1)$$

In formula (1), smoothed (e.g., normalized) magnitudes of the Fourier transform of the patches $\zeta_\sigma(=\hat{P}^l_i)$ are calculated, where $\zeta_\sigma$ indicates a Gaussian blur of standard deviation $\sigma$, that is used to stabilize the weights, $\omega_i$. In formula 1, the parameter p is used to control the trade-off between computing the arithmetic average of the burst (such as by setting p=0) or taking the maximum value at a given frequency along the burst (such as by setting p to a large value, p→∞) thereby producing sharper images.

In FBA, color images are handled by first converting them to grayscale, computing a one-channel weight map, and then replicating this one-channel weight map over the three-color channels. That is, the same weights are used for the three (e.g., R, G, and B) channels.

The FBA algorithm computes weights, $\omega_i$, to accumulate Fourier transforms, as shown in formula (1). However, the computation of these weights involves certain hand-tuned parameters. Hand-tuned parameters can mean parameters that are manually selected and/or selected by trial-and-error, as opposed to, for example, algorithmically calculated/selected parameters. Such hand-held parameters include, among others, the parameters p and $\sigma$ (or equivalently, the Gaussian blur or the standard deviation of the blur). While, FBA is simple, the quality of the resulting deblurred images is subject to the selection hand-tuned parameters. Certain values of such hand-turned parameters may work well for a certain type of images; but may not work for all cases (i.e., all types of images).

With respect to algorithms, such as the FBA or Local FBA algorithm, there is a need for selecting weights that do not depend on hand-selected parameters. That is, there is a need for selecting (e.g., determining, obtaining, etc.) weights that can result in consistently good and/or improved quality of deblurred images regardless of the types of input images (i.e., burst of images).

Implementations according to this disclosure use a convolutional neural network (CNN), and more specifically, a kernel-prediction convolutional network (KPCN) to estimate weights (i.e., kernels) to be applied to transform coefficients when combining the transform coefficients of corresponding transforms of corresponding patches of images of a burst. As further described and illustrated below, implementations according to this disclosure can result in improved deblurred (and/or denoised) images over other known techniques.

Neural networks, such as convolutional neural networks, have been used in image restoration (e.g., for deblurring images). These neural networks directly estimate a restored image. That is, the output of such neural networks is the estimated image itself. In a typical scenario, a blurred and/or noisy image (or characteristics thereof) can be used as input to the neural network and the neural network outputs the restored (e.g., deblurred and/or denoised) image.

Contrary to the direct estimation of the restored image, the strategy of kernel prediction involves proposing a predefined parametric transformation and letting the network estimate the parameters of this transformation. Kernel prediction networks (KPCNs) can converge significantly faster than direct prediction networks. Thus, training time of a KPCN can be shorter than direct prediction networks. Additionally, potentially less learnable parameters (e.g., operations, weights between nodes of different layers, etc.) may be needed for a KPCN to attain similar performance as a direct estimation network.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
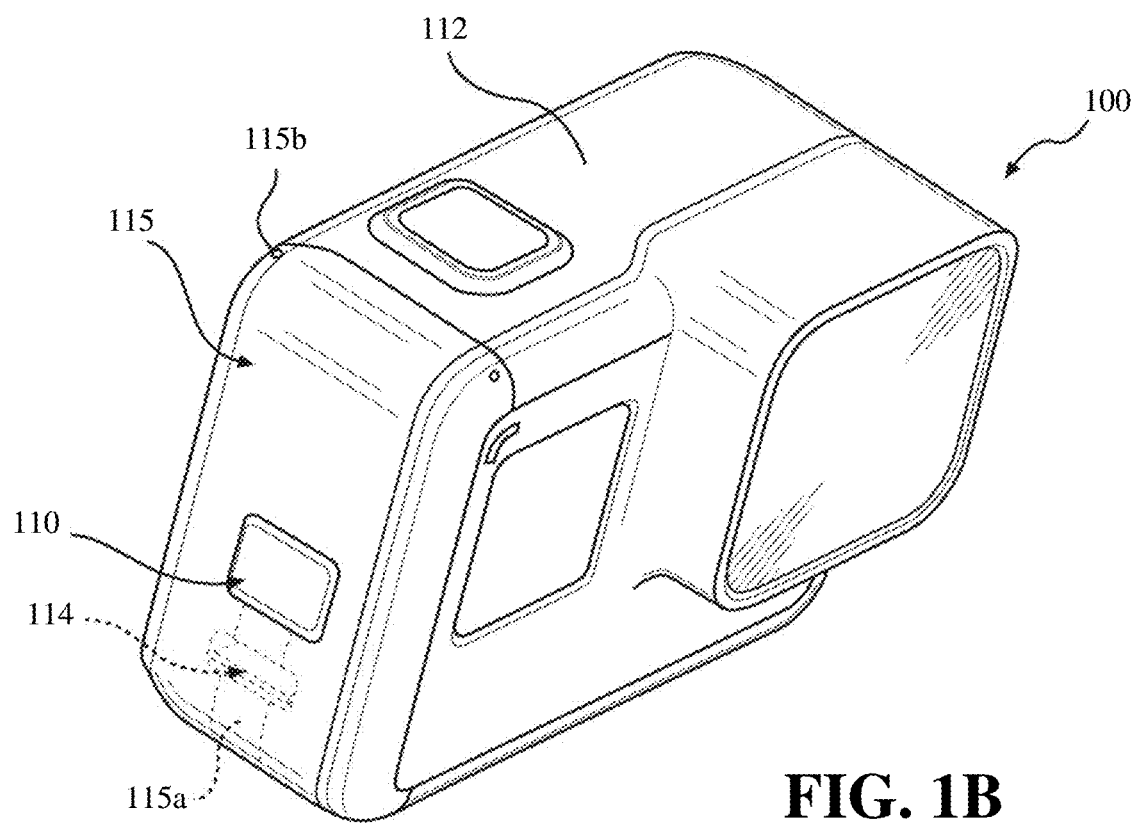
Figure 1C:
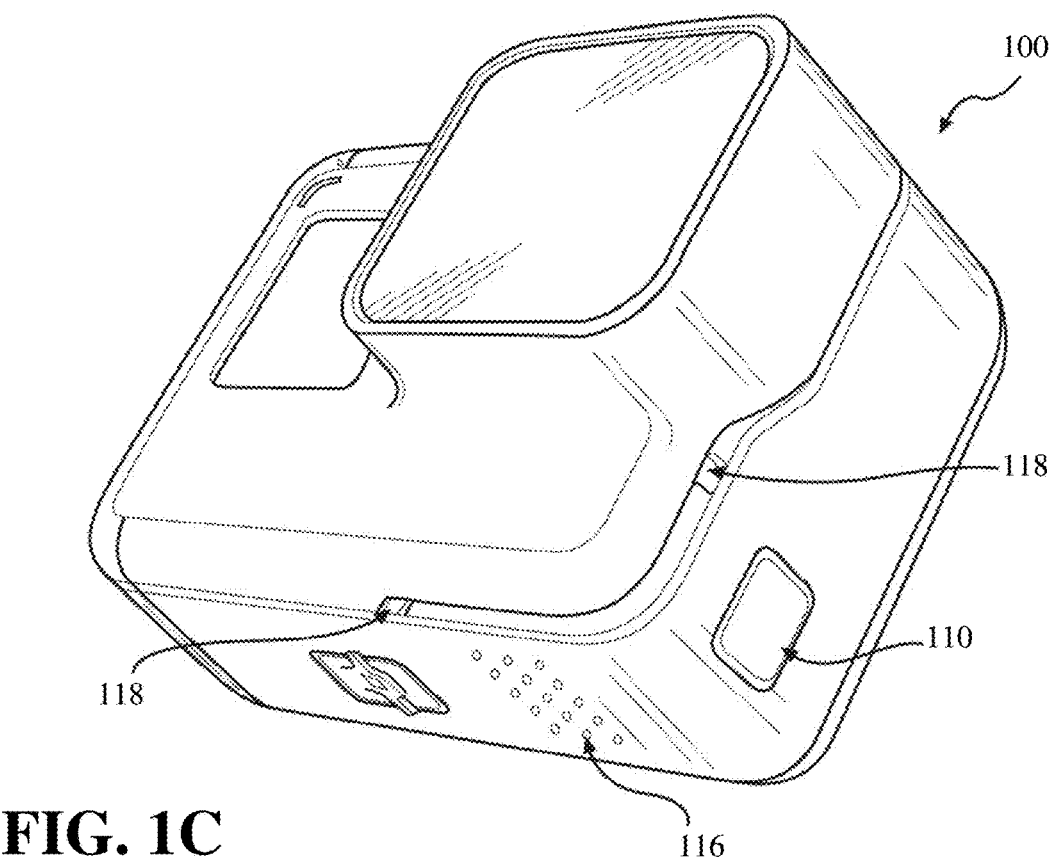
Figure 1D:
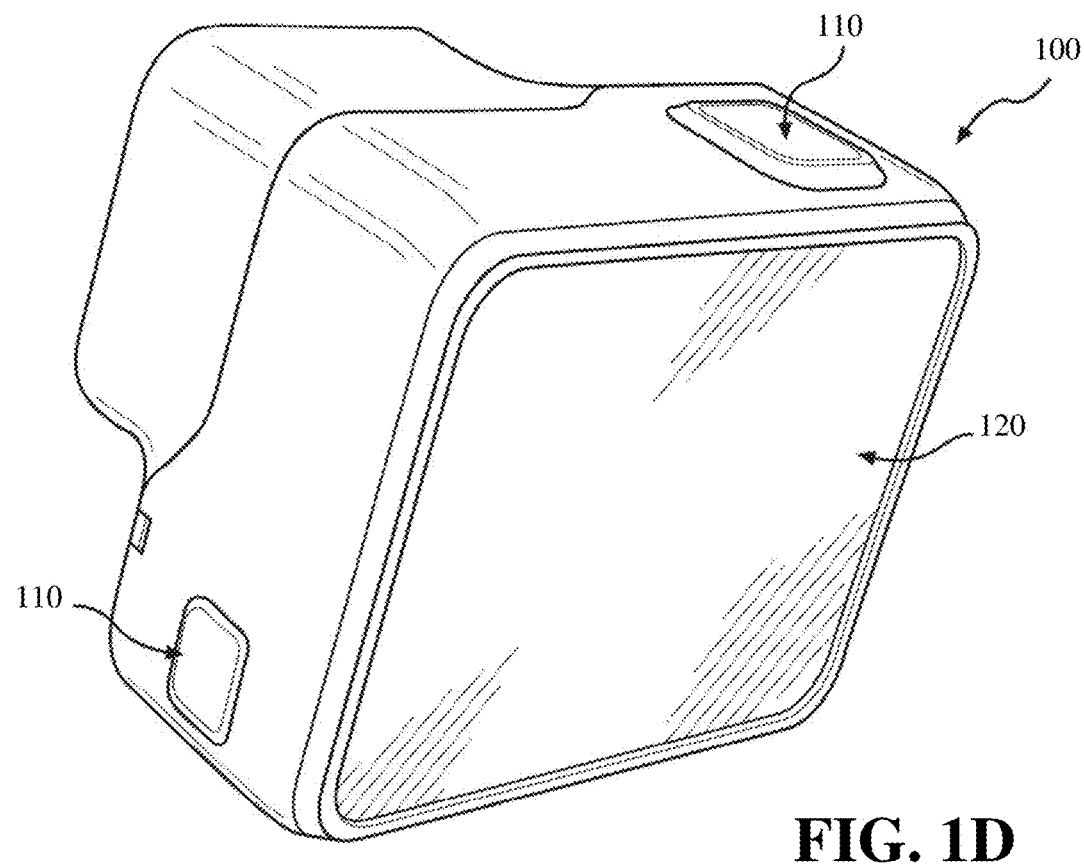

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
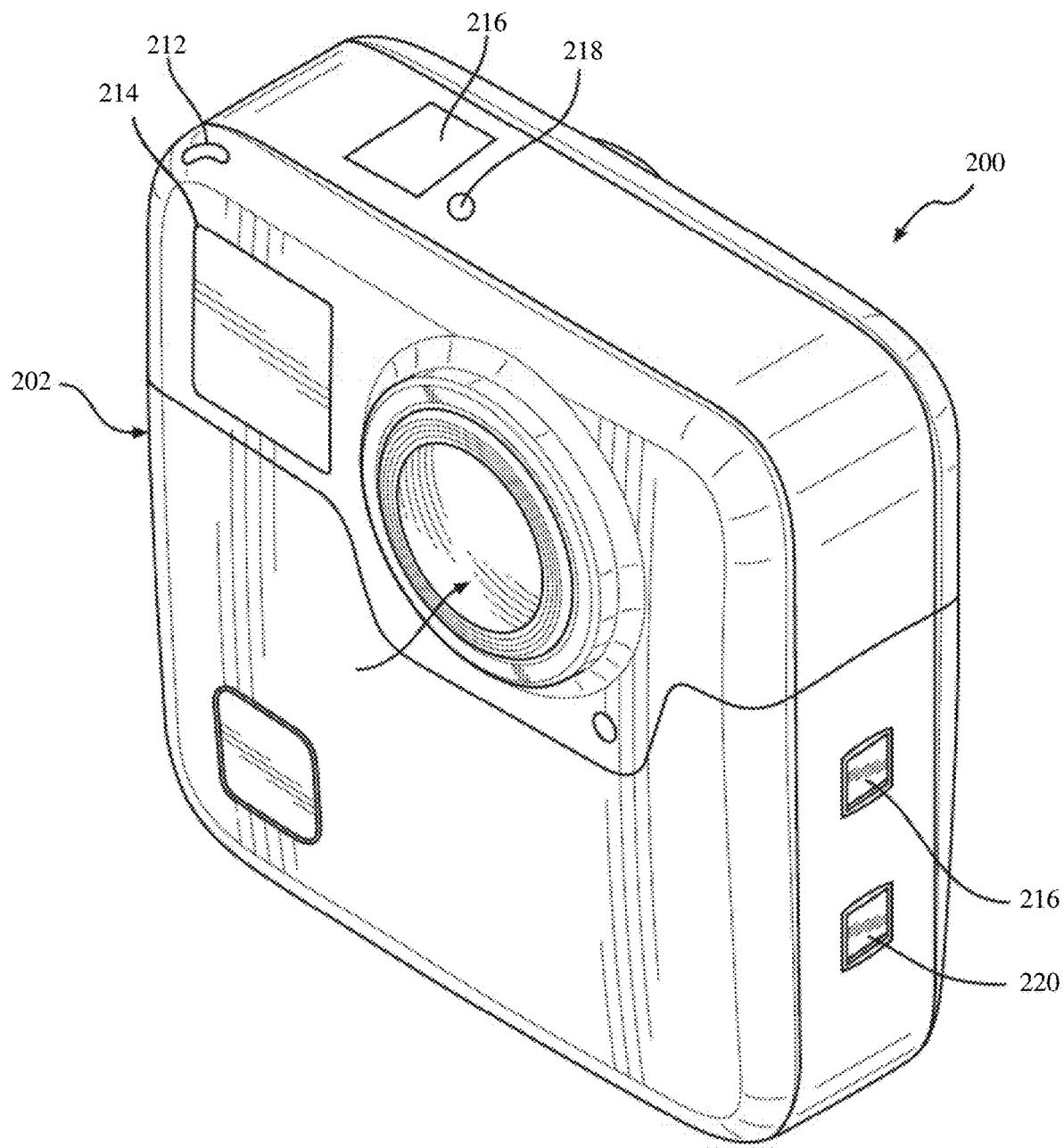
FIGS. 2A-B are isometric views of another example of an image capture device.
Figure 2B:
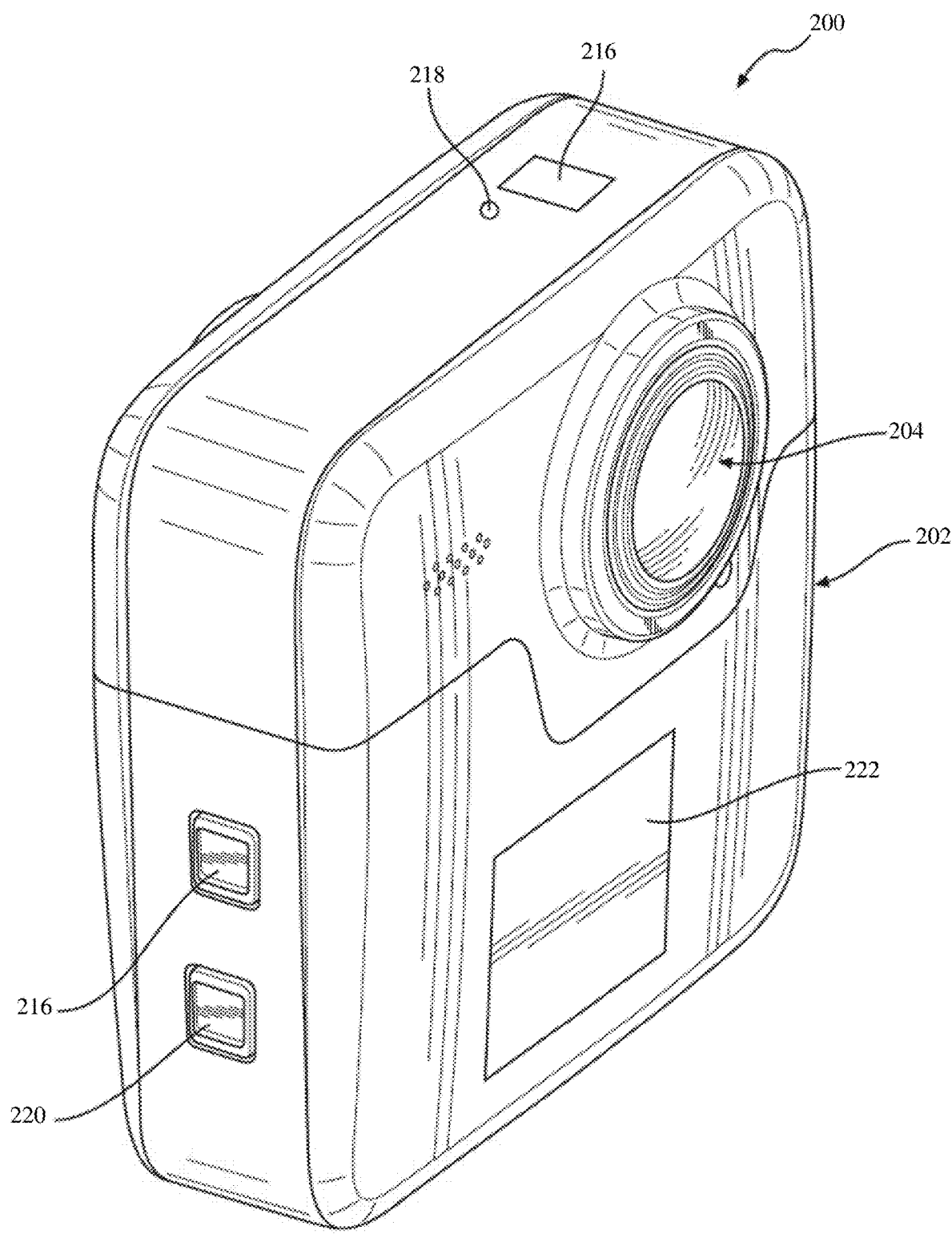

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
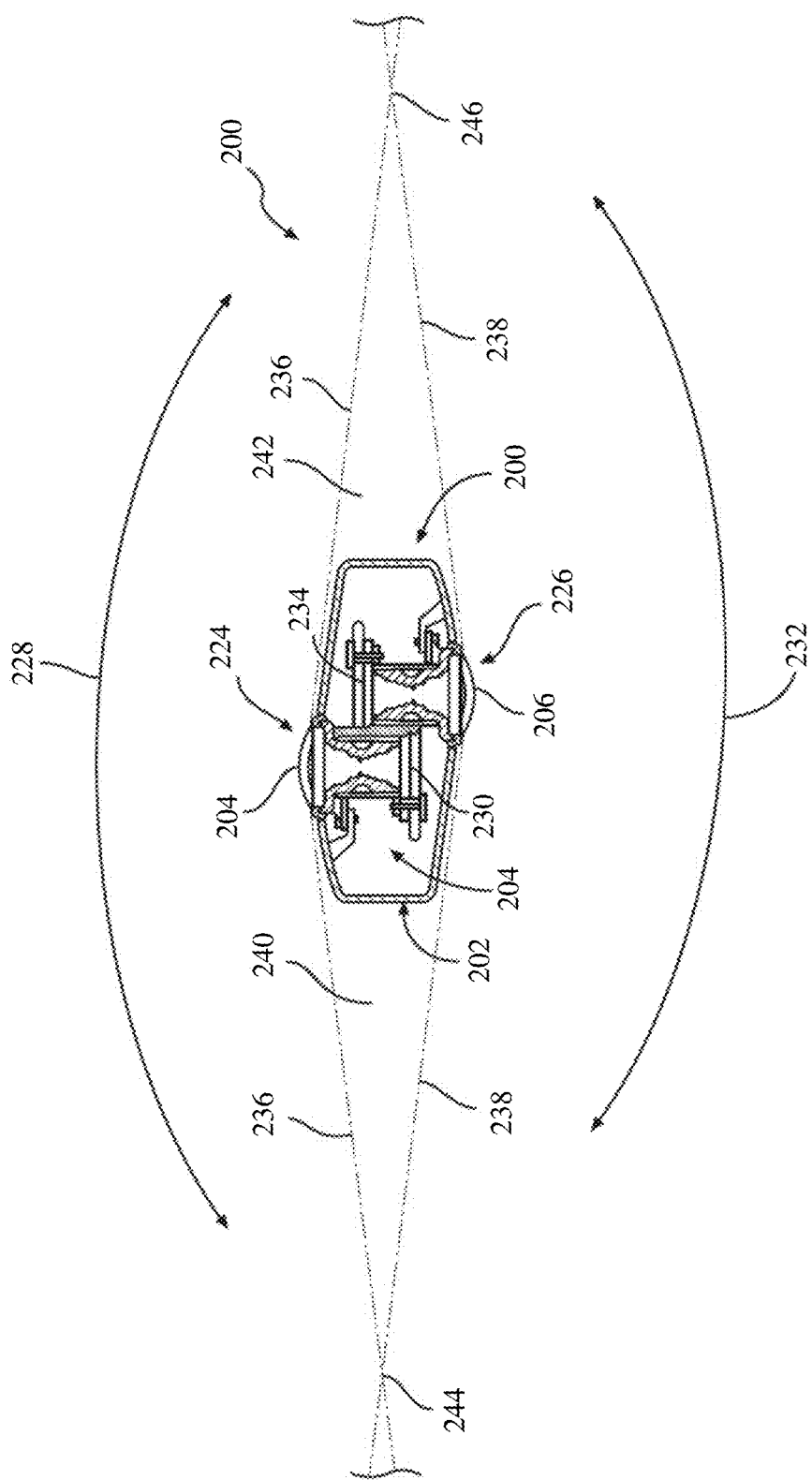
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 4:
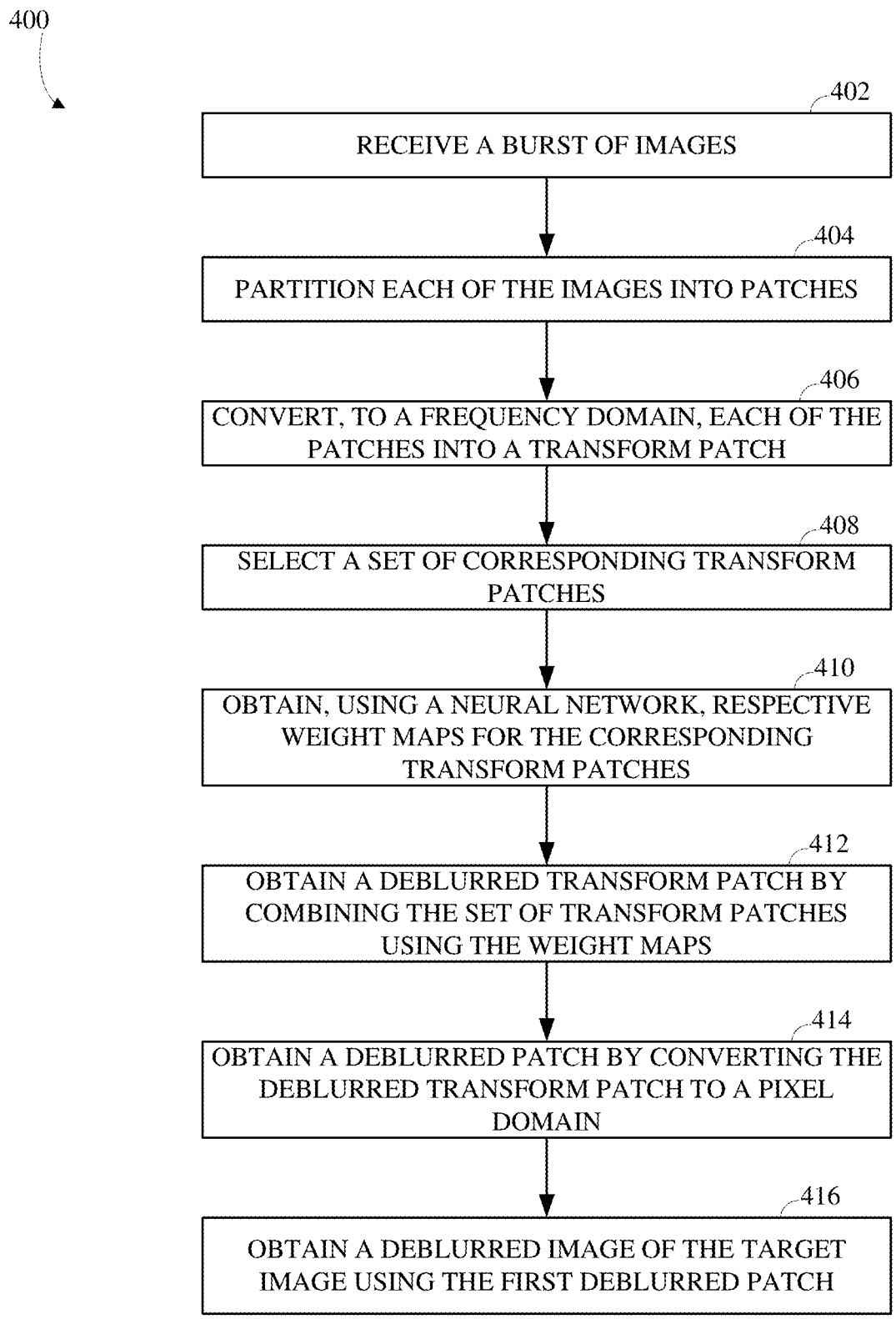
FIG. 4 is a flowchart of a technique for image deblurring in accordance with an implementation of this disclosure.

The image capture system 300 may be used to implement some or all of the techniques described in this disclosure, such as the technique 400 described in FIG. 4.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the technique 400 of FIG. 4.

As mentioned above, deblurring a blurred image can be performed using information from other images (i.e., from a burst of images). This can be based on the premise that the images of the burst of images are realizations of the same latent image with different blurring kernels. As such, motion blur can be modeled mathematically as given by formula (2).

$$\tilde{v}k*u+n \qquad (2)$$

In formula (2), $\tilde{v}$ is a noisy blurred observation (i.e., image), k is a blur kernel, u is the latent (i.e., the sharp, unblurred and/or noiseless) image, n is an additive noise, and "*" denotes a convolution operation. The model of formula (2) assumes a shift-invariant blurring kernel. Each of the images of the burst can be affected by a time-varying blurring kernel. However, the blurring kernels are not known. Additionally, the movement of each individual image can be considered as independent of the movement any other image of the burst of images since hand tremor vibrations are essentially random.

Unlike the deconvolution techniques described above, a blurring (or, equivalently, deblurring) kernel is not estimated herein. However, it can be observed that the kernel k of formula (2) does not augment the spectrum of the latent image. As such, the magnitude of the coefficients in the Fourier domain are always lower than the original magnitude of the coefficient of the latent image (i.e., the image without the blur).

The FBA and the algorithms disclosed herein rely on the fact that even if all the images of the burst of images are blurred, some of the transform (e.g., Fourier, DCT, etc.) coefficients will remain mostly unaltered. Motion blur can be seen as a low-pass filter and all Fourier coefficients of the low-pass filter are lower than 1. As such, high magnitude coefficients can indicate low degradation due to motion blur. Thus, larger weights can be assigned to transform coefficients of larger magnitude, and vice-versa. That is, the values of the weights increase as the values of the transform coefficients increase. Formula (1) above indicates that more (i.e., higher weights) of the coefficients less-influenced by blur are retained in the combination. Formula (1) is a linear combination of all the corresponding coefficients. The coefficients from the images which have been least influenced by blur are weighted more. On the other hand, coefficients from those images that are more blurry are weighed less.

FIG. 4 is a flowchart of a technique 400 for image deblurring in accordance with an implementation of this disclosure. The technique 400 can be implemented in an image capture device, such as the image capture device 100 of FIGS. 1A-1D or the image capture device 200 of FIGS. 2A-2C. The technique 400 can be implemented in an image capture system, such as the image capture system 300 of FIG. 3A or the image capture system 330 of FIG. 3B. The technique 400 can be implemented as executable instructions that are stored in a memory and executed by a processor, such as the processing apparatus 312 of FIG. 3A or processing apparatus 362 of FIG. 3B.

An overview of the technique 400 is described with respect to FIG. 5. FIG. 5 is a block diagram 500 of steps of deblurring an image (i.e., a target image) in accordance with an implementation of this disclosure. The technique 400 generates a deblurred and/or denoised image from a burst of images. The technique 400 partitions each of the images of the burst into patches, as shown by a block 502. Partitioning the images into patches can mean partitioning at least some of the color components of the image into patches. In an example, the technique 400 partitions each of the color components of the image. For a set of corresponding patches, the technique 400 obtains respective transform blocks, as shown by a block 504. That is, for each patch of the corresponding patches, the technique 400 obtains a transform block. Corresponding patches, as used herein, means a patch from each of the burst of images. To reiterate, corresponding patches means patches that, adjusted for blur, are coextensive in the burst of images. For each of the color channel patches (i.e., color component patches), the technique 400 can obtain a color component transform block. In an example, a patch can be transformed using the Discrete Cosine Transform (DCT). DCT can be chosen for its simplicity. However, other transform types are possible.

Said another way, to process a blurry burst of images, the technique 400 splits the burst of images (which can include 2M+1 images, where M=2, 3, or some other number of images) into sets of patches, $\{P^l\}_{l=1 \ldots Npatches}$, where Npatches is the number of patches. The technique 400 processes the sets of patches according to formula (3).

$$\overline{P^{l,ch}} = \mathcal{D}^{-1}\left(\sum_{i=-M}^{M} \omega_i \cdot \mathcal{D}(P_i^{l,ch})\right), \omega_i = f(\{\mathcal{D}(P^l)\}; \theta) \qquad (3)$$

In formula (3), $P^{l,ch}$ is one of the color channels of the patch $P^l$; and $\overline{P^{l,ch}}$ is the deblurred patch for the color channel ch. In an example, the color channels can be the RED, BLUE, and GREEN channels; thus, ch∈ {R, G, B}. In another example, the images can be represented using other color components (i.e., channels). In an example, the same weight $\omega_i$ can be used for each of the color channels. $\mathcal{D}$ ( ) and $\mathcal{D}^{-1}$( ) in formula (3) are the DCT and the inverse DCT, respectively. While any transform type can be used (e.g., Fourier, Fast Fourier, etc.), the DCT can be used for reasons of GPU memory efficiency. Additionally, experimentation has shown that practically the same results are produced when using the DCT as compared to using the Fast Fourier Transform (FFT).

The function $f(\{\mathcal{D}(P^l)\}; \theta)$ of formula (3) represents the output of a convolutional neural net (CNN) for a given set of learnable (i.e., learned during a training phase) parameters θ of the CNN. The function $f( )$ (i.e., the CNN) takes as input the channel-wise concatenation of the DCT transforms of the corresponding patches of the 2M+1 images of the burst, $\{\mathcal{D}(P^l)\}$. A block 506 of FIG. 5 represents the function $f(\{\mathcal{D}(P^l)\}; \theta)$. The output of the block 506 is the set of weights $\omega_i$, also referred to as weight maps, as shown by a block 508 in FIG. 5. For each of the transform blocks $TB_i$ (i.e., transform patches) that is output from the block 504 and input to the block 506, of the block 504, a weight map $\omega_i$ is output from the block 506. The transform patch $TB_i$ includes all the color channel transform patches for the patch. That is, $TB_i = \{TB_i^{ch}\}$. The weight map $\omega_i$ is used for each of the color channel transform patches.

As shown by an accumulator 510, all the $TB_i^{ch}$ are combined, position-wise, using the respective weight maps $\omega_i$ to obtain one deblurred transform block for the color channel, as shown by a block 512. The deblurred transform block corresponds to $$\sum_{i=-M}^{M} \omega_i \cdot \mathcal{D}(P_i^{l,ch})$$

in formula (3). The deblurred transform block (i.e., each of the color channels deblurred transform blocks) can then be inverse transformed (i.e., $$\mathcal{D}^{-1}\left(\sum_{i=-M}^{M} \omega_i \cdot \mathcal{D}(P_i^{l,ch})\right)$$

in formula (3)) back into the pixel domain to obtain respective deblurred color channel patches (i.e., $\overline{P^{l,ch}}$ in formula (3)), as shown by a block 514.

In an example, and as shown in FIG. 6, the patches can be partially overlapped. Overlapping the patches can provide more estimations per pixel thereby reducing the influence of blur and/or noise on the pixel (i.e., the deblurred pixel). Depending on the location of a pixel within an image, the pixel can be part of one, two, three, or four patches. As further described below, if a pixel is part of, for example, four patches, and as each patch is separately processed, the technique 400 generates four estimates for the pixel.

In an example, the technique 400 may be executed (e.g., performed) by an image capture device or system that may be limited in memory. For example, the technique 400 may be executed in a graphics processing unit (GPU). As such, it may not be possible to fit (e.g., store) several high-resolution (e.g., high-definition) images in the memory of the GPU. As such, overlapping the images patches can preserve memory.

Referring to FIG. 4, at 402, the technique 400 receives a burst of images. As used in this disclosure, "receive" can mean to create, form, produce, select, construct, determine, specify, generate, obtain, or other receive in any manner whatsoever. In an example, the technique 400 can receive the burst of images immediately upon an image capture device capturing the burst of images. In another example, the technique 400 can receive the burst of images upon a selection, such as by a user of a burst of images. In an example, a user can select a portion of a video from which the technique 400 can generate a deblurred image. As such, the frames of the portion of the video constitute the burst of images received by the technique 400.

At 404, the technique 400 partitions respective images of the burst of images into respective patches. In an example, the technique 400 can partition each of the images of the burst of images into the respective patches.

FIG. 6 is a diagram of an example of a burst of images 600 in accordance with a implementations of this disclosure. The burst of images 600 includes 2M+1 images; namely, images 602-610. In the burst of images 600, M is equal to 2. However, the burst of images can include fewer or more images. The images 602-610 of can be of any size. Non-limiting examples of image sizes include 800×600, 1024× 768, 1280×960, and 4000×3000. However, other image sizes are possible. Corresponding image patches 612-620 are patches of the images 602-610, respectively. Corresponding image patches 622-630 are patches of the images 602-610, respectively. The image patches 612-620 are illustrated with dotted lines to distinguish them from the image patches 622-630, which are illustrated with dashed lines.

Each of image patches 612-630 is of size m×n. In an example, m is 256 and n is 256. That is, each of the image patches 612-630 can be of size 256×256 pixels. However, other sizes are possible.

In an example, and as shown in FIG. 6, an image can be partitioned into overlapping patches. For example, the patch 612 overlaps the image patch 622, the image patch 614 overlaps the image patch 624, and so on. In an example, the overlap can equal to half the size of the patch. That is, for horizontally aligned patches, the size of the overlap area can be m/2×n (e.g., 128×256); and for vertically aligned patches, such as patches 632-634 of the image 602, the size of the overlap area is m×n/2 (e.g., 256×128). It is noted that patches corresponding to the patches 632 and 634 in the images 604-610 are not shown.

A pixel 636 is shown as being part of the patches 612 and 614. The pixel 636 is shown as being more centrally located within the image 602. As such, it is to be noted that, given the location of the pixel 636 within the image 602 and if all partitions of the image 602 were illustrated in FIG. 6, then the pixel 636 would be shown as being part of four patches.

Returning to FIG. 4, at 406, the technique 400 converts, to a frequency domain, each of the respective patches into a respective transform patch. In an example, the respective patches can include a plurality of color channel patches. For example, and in an example where the RGB color system is used, each respective patch includes one or more of a red color-component patch, a green color-component patch, and a blue color-component patch. As such, converting, to the frequency domain, each of the respective patches can include converting, to the frequency domain, at least a subset of the plurality of the color channel patches (i.e., at least one of the one or more of the red color-channel patch, the green color-channel patch, and the blue color-channel patch) to obtain one or more of a respective red transform patch, green transform patch, and/or blue transform patch.

At 408, the technique 400 selects a first set of corresponding transform patches from the respective transform patches. The first set of the corresponding transform patches includes a respective transform patch for a respective image of the burst of images. For example, the first set of corresponding transform patches includes a transform patch for each of the images of the burst of images. That is, and using the formula (3) as a reference, the technique 400 can obtain the transforms of the corresponding patches of the 2M+1 images of the burst. In an example, the technique uses the DCT transform. As such, the technique 400 obtains the set {D(P$^l$)}. In an example, the transforms can be obtained for all the color channels. As such, {D(P$^l$)} includes the transforms for all of the color channels. The color channels can be the red, blue, and green channels.

At 410, the technique 400 obtains, using a neural network, respective weight maps for the corresponding transform patches. That is, the technique 400 obtains, using the neural network, a respective weight map for each of the corresponding transform patches of the first set of corresponding transform patches. The neural network can be a kernel-prediction convolutional network.

FIG. 7 is an example of a kernel-prediction convolutional network (KPCN) 700 in accordance with implementations of this disclosure. The KPCN 700 does not include fully connected layers (i.e., dense operations). As compared to a neural network that directly estimates the result (i.e., a deblurred image), the KPCN 700 estimates the parameters of a certain, pre-fixed transformation.

The term "transformation" in the preceding sentence is used in a general sense, in contraposition to a direct estimation network. For example, let $f(\ )$ be the mapping of a direct estimation neural network. The relation between the input (e.g., In) and the output (e.g., Output) is directly linked to the direct estimation network as Output=$f$(In). Contrastingly, a kernel-estimation network (e.g., f_ker) estimates the parameters (e.g., Params) of a given transformation or function (e.g., T) which converts the input (e.g., In) to the output (e.g., Output): Params=f_ker(In) and Output=T(Params). This transformation T, which remains fixed, is designed by hand according to the problem to be solved. Formula (3) is such a transformation. The KPCN 700 estimates the weights, $\omega_i$, not the deblurred image. These weights are used to accumulate (e.g., as a linear combination) the DCTs of the patches. Here, the transformation T can be the linear combination.

A typical KPCN is composed of a number of convolutional operations (e.g., feature-extraction operations). The number of operations and their respective sizes is typically determined during a training phase of the KPCN. As a person skilled in the art recognizes, additional layers and/or operations can be included in the KPCN. For example, combinations of Pooling, MaxPooling, Dropout, Activation, Normalization, BatchNormalization, and other operations can be grouped with convolution operations. As a person skilled in the art recognizes, a convolution operation can use a SeparableConvolution2D or Convolution2D operation.

As used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer or the output of the KPCN is reached.

In a typical KPCN, each of the convolution layers may consist of a set of filters. While a filter is applied to a subset of the input data at a time, the filter is applied across the full input, such as by sweeping over the input. The operations performed by this layer are typically linear/matrix multiplications. The output of the convolution filter may be further filtered using an activation function. The activation function may be a linear function or non-linear function (e.g., a sigmoid function, an arcTan function, a tanH function, a rectified linear activation unit (ReLU), or the like.

In an example, the KPCN 700 includes a series of convolutional layers 706-708 with kernels of size 3×3, followed by a ReLU layer and a BatchNormalization layer. In an example, the depth of the network is set to 10 convolutional layers. Not all layers are shown in FIG. 7, as illustrated by ellipsis 710. The width is set to 96 feature maps.

As mentioned above, the KPCN 700 receives, as input, channel-wise concatenation of the DCT transforms of the corresponding patches of the 2M+1 images of the burst. A layer 702 illustrates the input layer of the KPCN 700. A block 704 illustrates one such block of DCT transforms for one image patch and for one color channel. As a non-limiting illustrative example, the block 704 may be the DCT transform block of the RED color channel of the patch 612 of FIG. 6. Although the input (i.e., the block 704) is shown as a block for ease of visualization, it is to be appreciated that the block 704 can be linearized (such as using a raster scan) prior be being used as input to the KPCN 700.

As mentioned, the KPCN 700 receives, as input, channel-wise concatenation of the DCT transforms of the corresponding patches of the 2M+1 images of the burst. That is, and using FIG. 6 as an illustration, each of the color components of blocks 612-620 of FIG. 6 are converted (e.g., using the DCT) to the frequency domain to obtain the corresponding transform patches. As such, the corresponding transform patches includes a total of 15 transform blocks (5 corresponding patches, one from each of the burst of images 600 of FIG. 6, multiplied by the 3 color channels (i.e., RED, GREEN, and BLUE)). If the image patch is of size 256×256 (as described in an example above), then each of the transform blocks includes 256*256=65,536 transform coefficients. As such, the KPCN receives a total of 65,536*15=983,040 inputs.

The KPCN 700 outputs a weight map, such as a weight map 712. The weight map includes weights to be used in combining the weights of the channel-wise concatenation of the DCT transforms. As mentioned above, the same weights can be used for all the color channels. Continuing with the above example to illustrate the weight map 712, there are 5 images in the burst of images 600 and, corresponding to each patch, there are 256*256=65,536 transform coefficients. Thus, for each transform location, the weight map includes 5 weights. Thus, a total of 65,536*5=327,680 weights are output from the KPCN 700. In an example, as the KPCN 700 outputs weights for 3 color channels (the RGB channels), then the KCPN 700 can output 327,680*3=983,040 weights with 327,680 of the weights being unique elements. Alternatively, the KPCN 700 can output 327,680 weights, which can be repeated 3 times. In any case, 983,040 weights are needed to multiply the 983,040 inputs.

The KPCN 700 can be trained using a training dataset that is generated from clean images (i.e., images that do not contain blur and/or noise). In an example, 200 clean images are used. However, more of fewer images can be used. The clean patches of the clean images can be blurred by convolving the clean patches with blur kernels generated according to a physiological camera shake model. In an example, the physiological camera shake model described in "F. Gavant, L. Alacoque, A Dupret, and D David. (October 2011). A Physiological Camera Shake Model for Image Stabilization Systems. SENSORS, 2011 IEEE, pp. 1461-1464," which is incorporated herein by reference. In this model, the intensity of the blur can be controlled with an exposition time parameter, which is chosen randomly. In an example, the patches are degraded further by applying noise to the patches according to a noise model. The noise model can be the noise model described in "Guo, Shi; Yan, Zifei; Zhang, Kai; Zuo, Wangmeng; & Zhang, Lei. (July 2019). Toward Convolutional Blind Denoising of Real Photographs. IEEE Conference on Computer Vision and Pattern Recognition, pp. 1712-1722," which is incorporated herein by reference. This noise model considers signal-dependent noise and a simplistic ISP processing pipeline. Each of the 200 clean images are degraded 10 times.

When sampling a training pair during training, seven out of the 10 training pairs are randomly chosen to improve the robustness of the network to permutation of the input frames. A random crop (i.e., a random set of patches) of 256×256 is extracted. In an example, the spatial location of the crop in the original image is chosen randomly. That is, for example, in one iteration, a 256×256 patch can be extracted from the top-right of the image; on the next iteration, a patch can be extracted more from the middle, etc. At each iteration, once the random location is chosen, the patches can be extracted from all of the 7 training images from this same spatial location (i.e. the corresponding patches). A total of m=200,000 training pairs are generated during each training epoch, and the mini-batch size is set to 24.

Any number of loss functions can be used to optimize the weights, θ, of the KPCN 700 during training. In an example, the loss function can be the L2 loss between the ground truth patch $P_j$ and the deblurred estimation, $\overline{P}_j$, output by the algorithm described with respect to FIG. 6. The deblurred estimation, $\overline{P}_j$, is the output of the block 514. The loss function is given by formula (4).

$$\mathcal{L}(\theta) = \frac{1}{2m} \sum_{j=1}^{m} \left\| \overline{P}_J - P_j \right\|^2 \quad (4)$$

In formula (4), m is the number of training examples per epoch.

Any number of techniques can be used (i.e., applied) to minimize the loss function. In an example, the ADAM algorithm, which is described in "Kingma, Diederik P. & Lei Ba, Jimmy. Adam: A Method for Stochastic Optimization. (2015). International Conference on Learning Representations 2015, pp. 1-15," which is incorporated herein by reference, can be applied to minimize the loss function. The values of the hyper-parameters of the ADAM algorithm can be set to their default values. However, other techniques are possible, such as AMSGrad, Nesterov, RMSprop, or variants of the ADAM algorithm itself, such, Nadam or AdaMax, or any other technique.

In an example, the number of training epochs can be set to 50. In an example, the learning rate (i.e., the amount by which the weights, θ, of the KPCN 700 can be updated during training) can be fixed for all epochs. In another example, the learning rate can change. In an example, the learning rate can be set to $1e^{-3}$ for the first 35 epochs and then changed to $1e^{-4}$ for the remaining epochs of the training.

FIG. 8 is a diagram of examples 800 of training pairs of KPCN in accordance with implementations of this disclosure. The examples 800 includes 2 examples of training pairs. The first example includes a ground truth image 802A (i.e., a clean image), a deblurred image 804A (i.e., the output deblurred image), and a set of seven blurry frames 806A (i.e., the frames of the burst of images). The second example includes a ground truth image 802B (i.e., a clean image), a deblurred image 804B, and a set of seven blurry frames 806B. No noise is added to the set of seven blurry frames 806A. Noise is added to the set of seven blurry frames 806B.

As mentioned above, noise, according to a noise model can be added to the training data. Experiments with adding and not adding noise, according to this disclosure, show that when the KPCN 700 is trained without adding noise to the input data, the KPCN 700 tends to over-sharpen the results. In has also been observed that if the frames of the blurry burst of images happen to be noisy, the output of the algorithm will also contain over-sharpened noise, which results in an unappealing effect in the deblurred image. As such, in an implementation, and to reduce this effect, the KPCN 700 can be trained with noisy patches. In this case, the KPCN 700 can learn a mapping between a noisy, blurry burst and a clean image instead of only a blurry burst and a clean image.

FIG. 9 is a comparative example 900 showing results of training with and without noise in accordance with implementations of this disclosure. An input image 902 is a training input image. A first deblurred image 904 is an output image when the KPCN 700 is trained without adding noise to the input image 902. A second deblurred image 906 is an output image when the KPCN 700 is trained by adding noise to the input image 902. The input image includes a text 908. However the text is blurred. As can be seen, the algorithm described herein, in both cases (i.e., training with adding and without adding noise), results in the text 908 becoming visible, as shown in a text 910 and a text 912 of the first deblurred image 904 and the second deblurred image 906, respectively. The text is "GARDE DE PARIS." However, noise 914 in the sky of the input image 902 is over-sharpened in the first deblurred image 904 (as indicated by noise 916) as compared to a noise 918 of the second deblurred image 906.

Returning again to FIG. 4, at 412, the technique 400 obtains a deblurred transform patch by combining the first set of respective transform patches using the respective weight maps.

Figure 10:
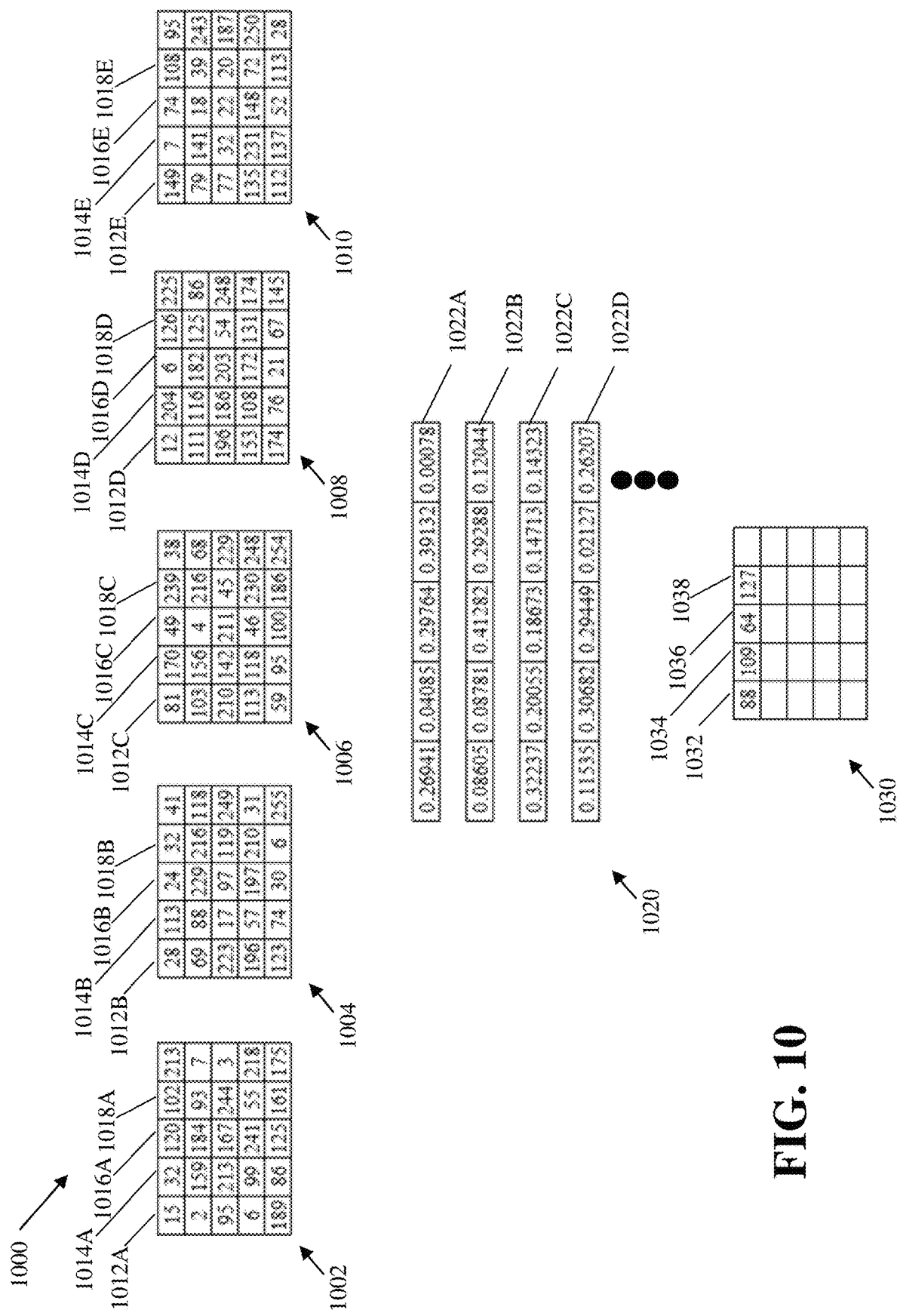
FIG. 10 is an example of obtaining a deblurred transform patch in accordance with implementations of this disclosure.

FIG. 10 is an example 1000 of obtaining a deblurred transform patch in accordance with implementations of this disclosure. The example 1000 illustrates performing the calculation $$\sum_{k=-M}^{M} \omega_i \cdot \mathcal{D}(P_i^{i,ch})$$

of formula (3).

The example 1000 includes five transform patches 1002-1010. The five transform patches 1002-1010 can be the set of corresponding transform patches described with respect to 408 of FIG. 4. For illustration purposes only, each of the transform patches 1002-1010 is shown as a 5×5 transform block. However, the disclosure is not so limited. For illustration purposes, the five transform patches 1002-1010 include random numbers, which may or may not be illustrative of real DCT coefficient values.

The example 1000 includes weight maps 1020. For illustration purposes, only 4 weight maps are shown; namely a weight map 1022A, a weight map 1022B, a weight map 1022C, and a weight map 1022D. As each of the transform blocks is a 5×5 block, thus including a total of 25 coefficients, the weight maps 1020 include 25 individual weight maps.

The weight maps 1020 are used to obtain a deblurred transform patch (i.e., a deblurred transform block 1030). Only partial results of the combining is illustrated. More specifically, only 4 of the deblurred transform coefficients of the deblurred transform block 1030 are shown; namely, the deblurred coefficients 1032-1038.

The weight map 1022A is used to combine coefficients 1012A, 1012B, 1012C, 1012D, and 1012E to obtain the deblurred coefficient 1032. The weight map 1022B is used to combine coefficients 1014A, 1014B, 1014C, 1014D, and 1014E to obtain the deblurred coefficient 1034. The weight map 1022C is used to combine coefficients 1016A, 1016B, 1016C, 1016D, and 1016E to obtain the deblurred coefficient 1036. The weight map 1022D is used to combine coefficients 1018A, 1018B, 1018C, 1018D, and 1018E to obtain the deblurred coefficient 1038. To illustrate, the deblurred coefficient 1032 is obtained as round (0.26941*15+0.04085*28+0.29764*81+0.39132*149+ 0.000778*12). Similar calculations apply to all of the deblurred coefficients of the deblurred transform block 1030.

Returning to FIG. 4, at 414, the technique 400 obtains a deblurred patch by converting the deblurred transform patch to a pixel domain. That is, for example, the technique 400 applies the inverse transform to the deblurred transform block 1030. Thus, the technique 400 performs an operation similar to $$\mathcal{D}^{-1}\left(\sum\nolimits_{i=-M}^{M}\omega_i \cdot \mathcal{D}(P_i^{i,ch})\right)$$

of formula (3).

At 416, the technique 400 obtains a deblurred image of the target image using the first deblurred patch. While described above is obtaining one deblurred patch, the technique 400 obtains deblurred patches corresponding to each set of patches of the images of the burst of images. That is, for example, if each of the burst of images is partitioned into N patches, then the technique 400 obtains N deblurred patches. The deblurred patches are assembled together into the deblurred image.

In an example, the technique 400 can include registering the burst of images to the target image prior to preforming the above described steps (i.e., 402-416). As such, the steps of the technique 400 operate on the registered images as opposed to the original bust of images. As such, the burst of images can be the set of registered burst of images.

Registering the burst of images means selecting one of the 2M+1 images of the burst of images as a reference image and registering the remaining images to the reference image. Registering the remaining images to the reference image results in generating equivalent images that are aligned so that all the images of the burst of images appear the same as the reference image.

Optical flow can be used to register the images. In an example, the images are down sampled so that optical flow calculation can be robust to the blur. The optical flow can be calculated at the coarser level. In an example, the optical flow is estimated between each image and the reference image in a forward direction (e.g., from the target image to the reference image) and the backward direction (e.g., from the reference image to the target image). The forward and backward flows can then be matched. In an example, the frame registration technique proposed in "Anger, Jérémy & Meinhardt-Llopis, Enric. (2017). Implementation of Local Fourier Burst Accumulation for Video Deblurring. Image Processing On Line," which is incorporated herein by reference and reproduced below in Table I, can be used.

TABLE I

| | Consistent Registration |
|---|---|
| 1 | {$D_m$} = convert_grey(downsample$_\tau$ ({$I_m$})) |
| 2 | for m from 0 to 2M do |
| 3 |     $F_{m \to M}$ = upsample$_\tau$ (optical flow($D_m$, $D_M$)) |
| 4 |     $F_{M \to m}$ = upsample$_\tau$ (optical flow($D_M$, $D_m$)) |
| 5 |     displacement_error(x) = \| $F_{M \to m}$(x) + $F_{m \to M}$(x + $F_{M \to m}$(x)) \|$_2$ |
| 6 |     cMap = blur$_{\sigma_m}$(erode$_\tau$ (displacement error < ε)) |
| 7 |     $I^*_m$(x) = $I_m$(x + $F_{m \to M}$(x)) |
| 8 |     $I^*_m$ = $I^*_m$cMap + $I_M$(1 − cMap) |

The registration algorithm of Table I receives, as input a sequence of 2M+1 images, {$I_m$}; a blur radius, $\sigma_m$; an erosion radius, r; a displacement tolerance, ε; and a down-sampling factor, τ. In an example, the blur radius can be set to $\sigma_m$=5. In an example, the erosion radius can be set to r=5. In an example, the displacement tolerance can be set to ε=1. In an example, the down-sampling factor can be set to τ=⅓. The registration algorithm of Table I outputs a registered sequence {$I^*_m$}.

In row 1 of Table I, the algorithm down-samples the burst of images and converts the down-sampled images to grey. Row 2 indicates that the steps in rows 3 to 8 are each of the images of the burst of images. The rows 3-8 register each of the 2M+1 frames of the burst of images to a reference image $D_M$, which is the image at the center of the burst of images (i.e., the image that is at index M). At row 3, the algorithm performs a forward optical flow between an image and the reference image. At row 4, the algorithm perform a backward optical flow from the reference image to the image. At row 5, for each pixel x, a displacement error is calculated as a displacement error is calculated using the backward and the forward flows. If the forward and backward flows introduce a displacement error for a pixel, a low confidence will be associated with the pixel. A consistency map is calculated in row 6. The consistency map identifies inconsistent areas, due to motion, between the image and the reference image. At row 7, the image is registered to the reference frame. At row 8, the reference image is copied over the registered image for those areas identified as inconsistent in the consistency map.

In an example, so that all patches are of the same size, it may be necessary to pad the images. For example, assume that each image is of size 100×100 and that it is desirable to have patches of sizes 12×12. Assume also that the patches are not overlapped. The images can be padded so that a total of 9 full patches are formed in each of the horizontal and vertical directions. In an example, a fixed value (e.g., zero padding) may be used for the padding. In another example, the value of the last pixel in an image row/column can be used for padding. In yet another example, reflection padding can be performed.

As mentioned above, the patches may be overlapped. As such, the deblurred patches may also be overlapped. As such, to obtain the deblurred image, if a pixel location of the deblurred image is included in included in multiple deblurred patches, then the value of that pixel location can be set to the average of the pixel values corresponding to that location in the overlapping patches that include the pixel location. As such, the technique 400 can include, obtaining a second deblurred patch from a second set of corresponding transform patches, wherein the second deblurred patch overlaps the first deblurred patch, and averaging co-located pixel values of the first deblurred patch and the second deblurred patch.

Figure 11A:
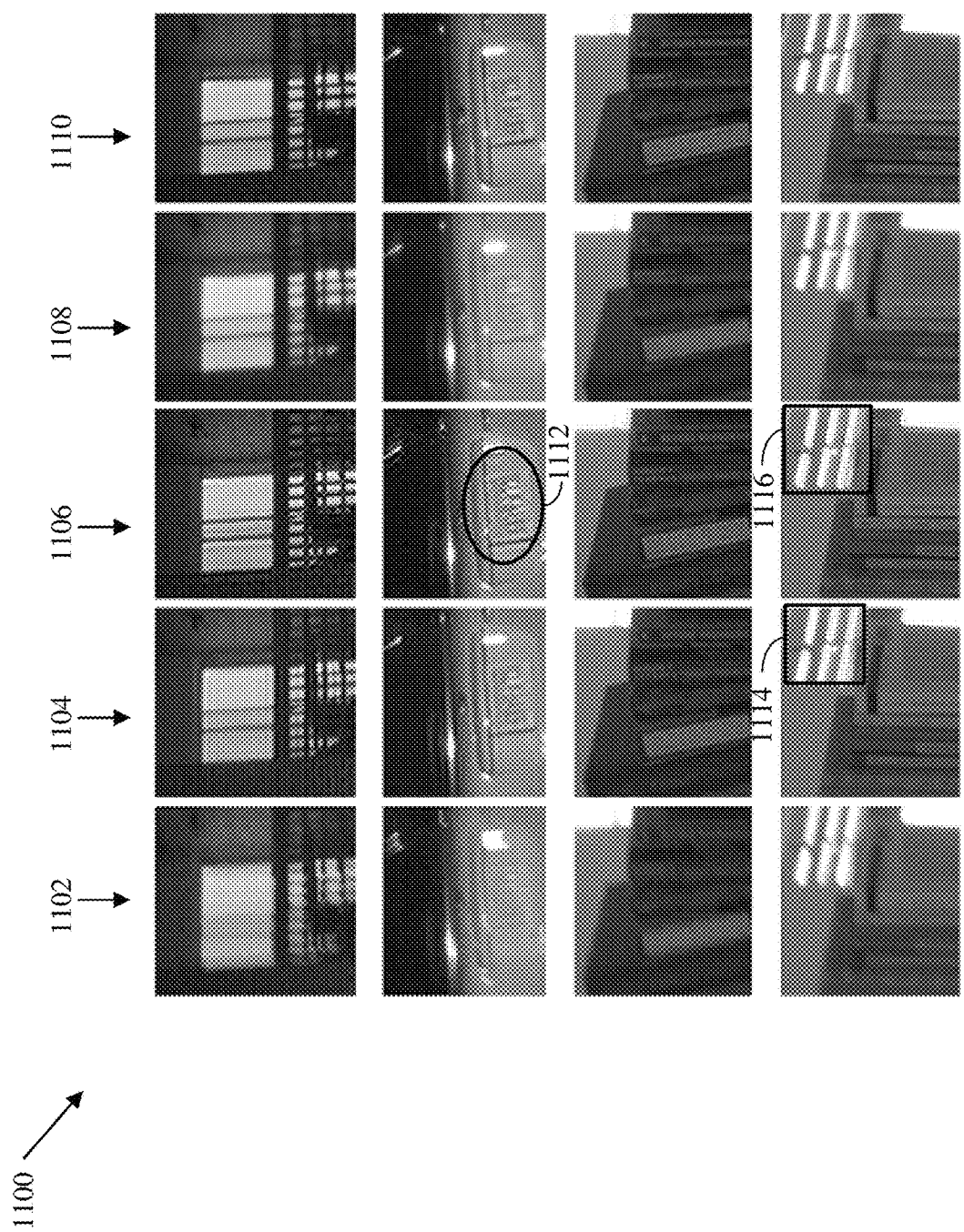
FIG. 11A is a first comparative example of obtaining deblurred images using different deblurring techniques.

FIG. 11A is a first comparative example 1100 of obtaining deblurred images using different deblurring techniques. Different input (blurred images) are shown in a first column 1102. Columns 1104-1108 illustrate deblurred images obtained using different multi-frame blind deconvolution techniques. A column 1110 illustrates deblurred images obtained according to the techniques disclosed herein.

The techniques of columns 1104 and 1106 first proceed to estimate the blurring kernels considering all the frames in the input burst, and then continue with a step of multi-image non-blind deconvolution, which results in a high computational and memory cost. It can be observed that these approaches introduce noticeable artefacts. For example, sharp results, but often with ringing artifacts, can be seen in a license plate 1112. Both approaches also introduce artifacts in saturated regions, such as in a region 1114 and a region 1116. The images of the column 1110 are comparable or even superior results with respect to the results of these blind deconvolution methods. The method of the column 1108 performs aligning and averaging the images of the burst of images. Although the techniques proposed herein may be similar in spirit, the results (i.e., the images of the column 1110) of the techniques proposed herein yield significantly sharper results than those of the aligning and averaging technique (i.e., the images of the column 1108).

Figure 11B:
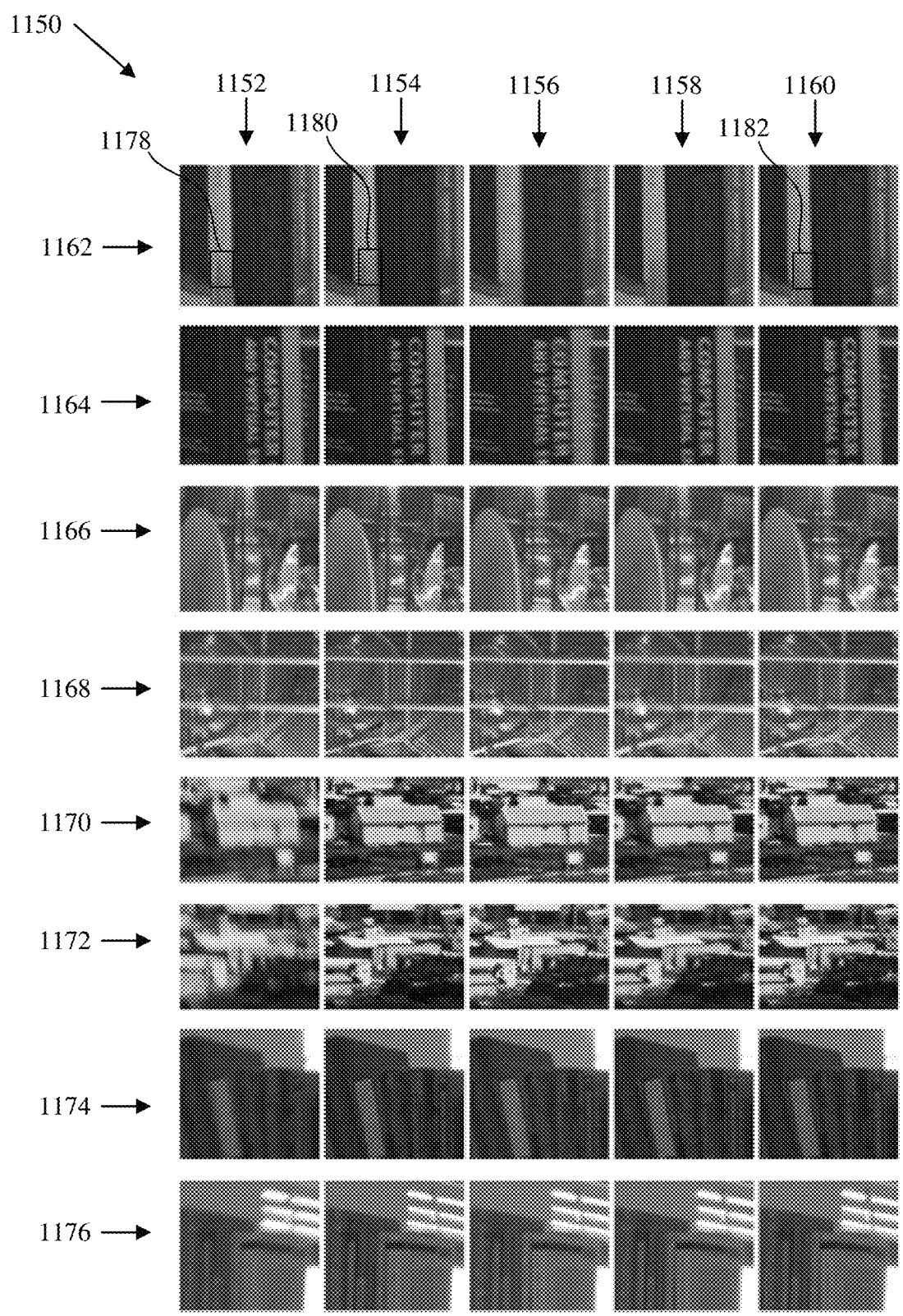
FIG. 11B is a second comparative example of obtaining deblurred images using different deblurring techniques.

FIG. 11B is a second comparative example 1150 of obtaining deblurred images using different deblurring techniques. Different input (blurred images) are shown in a first column 1152. Columns 1154-1158 illustrate deblurred images obtained using different multi-image aggregation techniques based on neural network architectures. A column 1160 illustrate deblurred images obtained according to the techniques disclosed herein.

The second comparative example 1150 includes bookshelf scenes (i.e., a scene 1162, a scene 1164, a scene 1174), dishwasher scenes (i.e., a scene 1166, a scene 1168), Cabo Polonio scenes (i.e., a scene 1170, a scene 1172), and a blinds scene (i.e., a scene 1176).

The bookshelf and dishwasher scenes are two challenging bursts shot under dim light conditions with a shaky hand. The Cabo Polonio scenes are generated from clean images by using different blur kernels with strong blur intensities.

The column 1154 includes the results of a method that uses permutation invariant CNN. The column 1156 includes the results of a method that uses a recurrent neural architecture. The column 1158 includes the results of the Local FBA method referred to above.

It is noted that all algorithms exhibit good results in the bookshelf and Cabo Polonio scenes. In general, saturated areas are handled correctly by all methods. An area 1178 of the input image includes the numbers "023." The numbers are fairly visible in an area 1180 and visible to a lesser extent in an area 1182. The numbers "023" are not visible in the deblurred images produced by the methods of the columns 1154 and 1156. This implies that the techniques according to this disclosure are able to select sharp information from the frames of the burst even if all of the frames are blurry.

Figure 12:
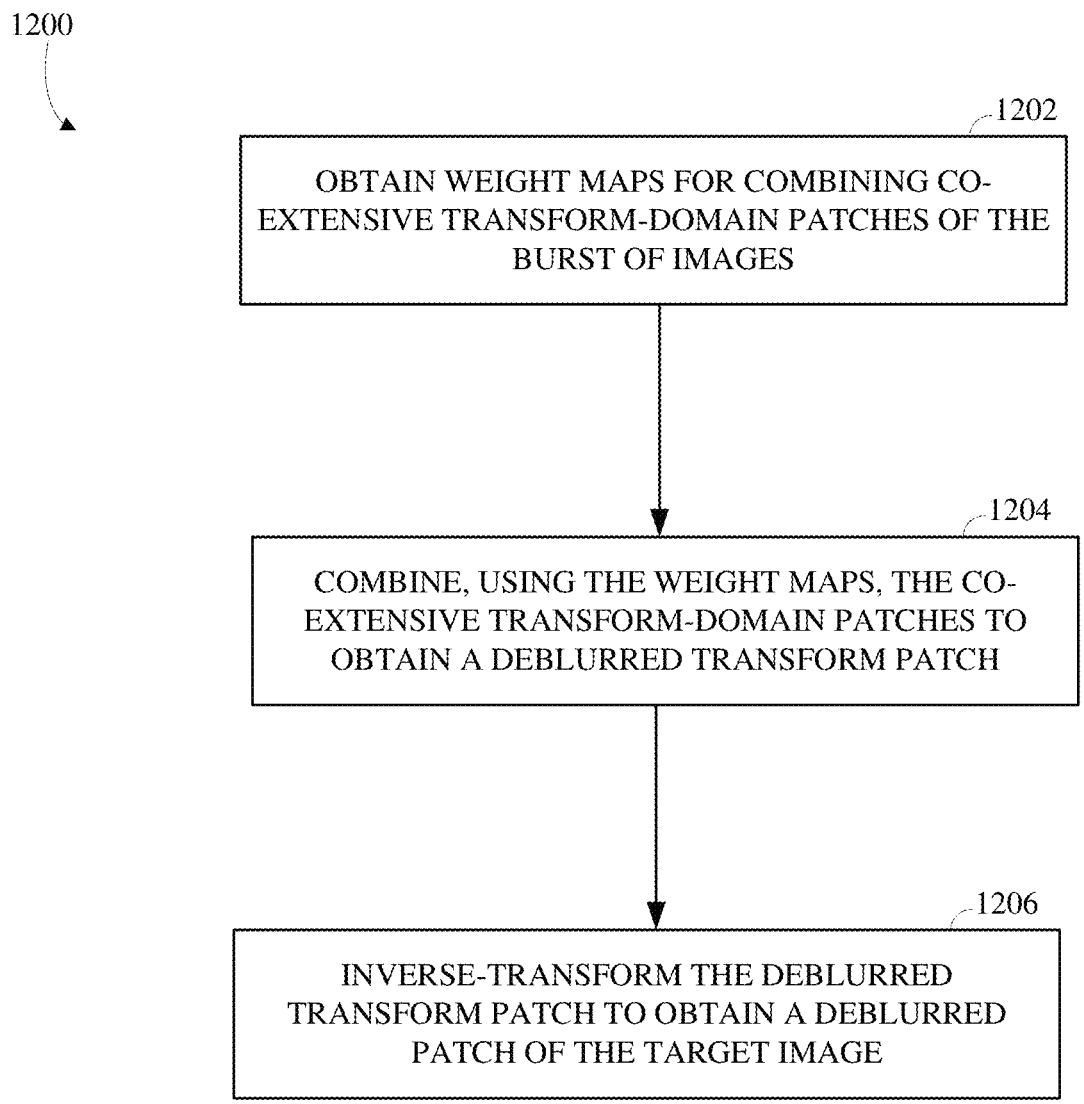
FIG. 12 is an example of a technique for deblurring a target image of a burst of images according to implementations of this disclosure.

FIG. 12 is an example of a technique 1200 for deblurring a target image of a burst of images according to implementations of this disclosure. The technique 1200 can be implemented in an image capture device, such as the image capture device 100 of FIGS. 1A-1D or the image capture device 200 of FIGS. 2A-2C. The technique 1200 can be implemented in an image capture system, such as the image capture system 300 of FIG. 3A or the image capture system 330 of FIG. 3B. The technique 1200 can be implemented as executable instructions that are stored in a memory and executed by a processor, such as the processing apparatus 312 of FIG. 3A or processing apparatus 362 of FIG. 3B.

At 1202, the technique 1200 obtains weight maps for combining co-extensive transform-domain patches of the burst of images. The co-extensive transform-domain patches can include patches from respective images of the burst of images. For example, each of the co-extensive transform-domain patches can be a patch of a respective image of the burst of images. The weight maps can correspond to respective transform domain patches of the co-extensive transform-domain patches. For example, each weight map can correspond to a respective transform domain patch of the co-extensive transform-domain patches. The weight maps can be obtained using a kernel prediction neural network, as described above. The kernel prediction neural network can include convolutional layers but does not include any fully connected layers.

In an example, the technique 1200 can partition the images of the burst of images into respective patches, transform the respective patches to a transform domain to obtain respective transform-domain patches, and use the respective transform-domain patches as input to the kernel prediction neural network. In an example, the technique 1200 can partition each image of the burst of images into the respective patches. In an example, and as also described above, the respective patches can be overlapping patches. The respective patches can overlap in at least one of a horizontal direction or a vertical direction. For example, the respective patches can each be of size m×n in pixels, where m and n are positive even integers. In an example, consecutive horizontal patches can overlap horizontally by m/2 pixels. In an example, consecutive vertical patches can overlap vertically by n/2 pixels. The technique 1200 can use one of a Discrete Cosine Transform (DCT), a Fourier transform, or a Fast Fourier Transform (FFT) to transform the co-extensive transform-domain patches to the transform domain. However, other transform types are possible.

At 1204, the technique 1200 combines, using the weight maps, the co-extensive transform-domain patches to obtain a deblurred transform patch. The technique 1200 can combine the co-extensive transform-domain patches as described with respect to FIG. 10.

In an example, the images of the burst of images includes more than one color channel. In an example, each of the images of the burst of images includes the more than one color channel. In an example, the color channels can be the red, green, and blue color channels. However, other color channels are possible. In an example, obtaining, at 1202 of the technique 1200, the weight maps can include obtaining the weight maps for co-extensive transform-domain patches of one color channel of the more than one color channel of the burst of images. In an example, combining, at 1204 of the technique 1200, using the weight maps, the co-extensive transform-domain patches can include using the weight maps of the one color channel of the color channels with the other of the color channels.

At 1206, the technique 1200 inverse-transforms the deblurred transform patch to obtain a deblurred patch of the target image.

Figure 13:
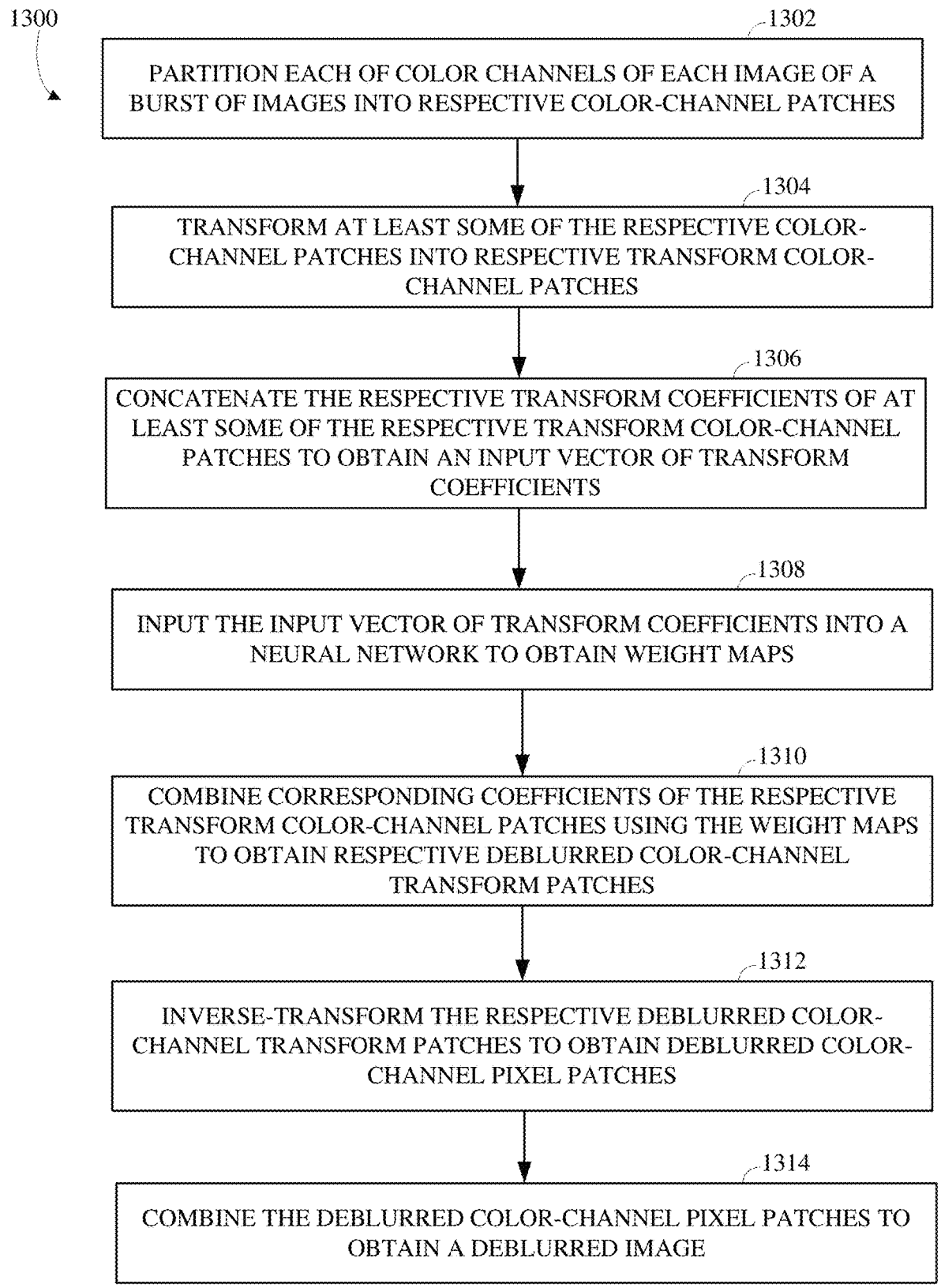
FIG. 13 is an example of a technique for deblurring a target image of a burst of images according to implementations of this disclosure.

FIG. 13 is an example of a technique 1300 for deblurring a target image of a burst of images according to implementations of this disclosure. The technique 1300 can be implemented in an image capture device, such as the image capture device 100 of FIGS. 1A-1D or the image capture device 200 of FIGS. 2A-2C. The technique 1300 can be implemented in an image capture system, such as the image capture system 300 of FIG. 3A or the image capture system 330 of FIG. 3B. The technique 1300 can be implemented as executable instructions that are stored in a memory and executed by a processor, such as the processing apparatus 312 of FIG. 3A or processing apparatus 362 of FIG. 3B.

At 1302, the technique 1300 partitions color channels of images of a burst of images into respective color-channel patches, as described above. In an example, the technique 1300 partitions each color channel of each of the images of the burst of images into the respective color-channel patches. The burst of images includes the target image. The respective color-channel patches can satisfy at least one of horizontally adjacent patches of the respective color-channel patches overlap horizontally or vertically adjacent patches of the respective color-channel patches overlap vertically.

At 1304, the technique 1300 transforms at least some of the respective color-channel patches into respective transform color-channel patches, as described above. Each of the respective transform color-channel patches is composed of respective transform coefficients.

At 1306, the technique 1300 concatenates the respective transform coefficients of at least some of the respective transform color-channel patches to obtain an input vector of transform coefficients, as described above. At 1308, the technique 1300 inputs the input vector of transform coefficients into a neural network to obtain weight maps, as described above. In an example, the neural network includes convolutional layers but does not include fully connected layers. At 1310, the technique 1300 combines corresponding coefficients of the respective transform color-channel patches using the weight maps to obtain respective deblurred color-channel transform patches, as described above.

At 1312, the technique 1300 inverse-transforms the respective deblurred color-channel transform patches to obtain deblurred color-channel pixel patches, as described above. AT 1314, the technique 1300 combines the deblurred color-channel pixel patches to obtain a deblurred image, as described above.

In an example, the technique 1300 uses the discrete cosine transform to transform the at least some of the respective color-channel patches into the respective transform color-channel patches and uses the inverse discrete cosine transform to inverse-transform the deblurred color-channel transform patches to obtain the deblurred color-channel pixel patches.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for deblurring a target image, comprising:
   receiving a burst of images, wherein the burst of images comprises the target image;
   partitioning respective images of the burst of images into respective patches;
   converting, to a frequency domain, the respective patches into respective transform patches;
   selecting a first set of corresponding transform patches from the respective transform patches, wherein the first set of the corresponding transform patches comprises a respective transform patch for a respective image of the burst of images;
   obtaining, using a neural network, respective weight maps for the corresponding transform patches, wherein the corresponding transform patches are used as input to the neural network and the respective weight maps are output by the neural network, and wherein the respective weight maps include weights for combining transform coefficients of the corresponding transform patches;
   obtaining a deblurred transform patch by combining the first set of corresponding transform patches using the respective weight maps;
   obtaining a first deblurred patch by applying an inverse transform to convert the deblurred transform patch to a pixel domain; and
   obtaining a deblurred image of the target image using the first deblurred patch.

2. The method of claim 1, wherein the respective patches of a first image of the burst of images includes a first patch and a second patch, and wherein the first patch overlaps the second patch.

3. The method of claim 1, further comprising:
   obtaining a second deblurred patch from a second set of corresponding transform patches, wherein the second deblurred patch overlaps the first deblurred patch; and
   averaging co-located pixel values of the first deblurred patch and the second deblurred patch.

4. The method of claim 1, wherein the neural network is a kernel prediction network that is trained to output the respective weight maps.

5. The method of claim 1, further comprising:
   registering the burst of images to the target image to align the burst of images to the target image.

6. The method of claim 1,
   wherein a respective patch comprises a plurality of color channel patches, and
   wherein converting, to the frequency domain, the respective patches into the respective transform patches comprises:
   converting, to the frequency domain, at least a subset of the plurality of the color channel patches.

7. The method of claim 1, wherein the burst of images is a set of frames of a video.

8. An image capture device for deblurring a target image of a burst of images, comprising:
   a processor that is configured to:
   obtain, using a kernel prediction neural network that includes convolutional layers and does not include fully connected layers, weight maps for combining co-extensive transform-domain patches of the burst of images, wherein the co-extensive transform-domain patches include patches from respective images of the burst of images, and wherein the weight maps correspond to respective transform domain patches of the co-extensive transform-domain patches;
   combine, using the weight maps, the co-extensive transform-domain patches to obtain a deblurred transform patch; and
   inverse-transform the deblurred transform patch to obtain a deblurred patch of the target image.

9. The image capture device of claim 8, wherein the processor is further configured to:
   partition the images of the burst of images into respective patches;
   transform the respective patches to a transform domain to obtain respective transform-domain patches; and
   use the respective transform-domain patches as input to the kernel prediction neural network.

10. The image capture device of claim 9, wherein the respective patches are overlapping patches.

11. The image capture device of claim 10, wherein the respective patches are overlapped in at least one of a horizontal direction or a vertical direction.

12. The image capture device of claim 11,
    wherein the respective patches are each of size m×n in pixels, where m and n are positive even integers,
    wherein the respective patches include a first patch, a second patch, and a third patch,
    wherein the first patch and the second patch overlap horizontally by m/2 pixels, and
    wherein the first patch and the third patch overlap vertically by n/2 pixels.

13. The image capture device of claim 9, wherein to transform the co-extensive transform-domain patches to the transform domain to obtain the respective transform patches comprises to:

transform the co-extensive transform-domain patches using a Discrete Cosine Transform (DCT), a Fourier transform, or a Fast Fourier Transform (FFT).

14. The image capture device of claim 8,
wherein the images of the burst of images comprise more than one color channel, and
wherein to obtain the weight maps comprises to:
obtain the weight maps for co-extensive transform-domain patches of one color channel of the more than one color channel of the burst of images; and
wherein to combine, using the weight maps, the co-extensive transform-domain patches comprises to:
use the weight maps of the one color channel of the color channels with the other of the color channels.

15. A non-transitory computer-readable storage medium, comprising executable instructions that, when executed by a processor, facilitate performance of operations to deblur or denoise a target image, wherein the operations include operations to:
partition color channels of images of a burst of images into respective color-channel patches, wherein the burst of images includes the target image;
transform at least some of the respective color-channel patches into respective transform color-channel patches, wherein the respective transform color-channel patches are composed of respective transform coefficients;
concatenate the respective transform coefficients of at least some of the respective transform color-channel patches to obtain an input vector of transform coefficients;
input the input vector of transform coefficients into a neural network to obtain weight maps, wherein the weight maps include weights for combining corresponding transform coefficients of the respective transform color-channel patches;
combine the corresponding coefficients of the respective transform color-channel patches using the weight maps to obtain respective deblurred color-channel transform patches;
inverse-transform the respective deblurred color-channel transform patches to obtain deblurred color-channel pixel patches; and
combine the deblurred color-channel pixel patches to obtain a deblurred image.

16. The non-transitory computer-readable storage medium of claim 15,
wherein to transform the at least some of the respective color-channel patches into the respective transform color-channel patches uses a discrete cosine transform, and
wherein to inverse-transform the deblurred color-channel transform patches to obtain the deblurred color-channel pixel patches uses an inverse of the discrete cosine transform.

17. The non-transitory computer-readable storage medium of claim 15, wherein the neural network comprises convolutional layers and does not include fully connected layers.

18. The non-transitory computer-readable storage medium of claim 15, wherein respective color-channel patches satisfy at least one of:
horizontally adjacent patches of the respective color-channel patches overlap horizontally, or
vertically adjacent patches of the respective color-channel patches overlap vertically.

19. The method of claim 1, wherein the neural network is a convolutional neural network.

20. The method of claim 4, wherein the kernel prediction network comprises convolutional layers and does not include fully connected layers.

* * * * *